US012306052B2

(12) United States Patent
Watanabe

(10) Patent No.: US 12,306,052 B2
(45) Date of Patent: May 20, 2025

(54) PRESSURE SENSITIVE SENSOR

(71) Applicant: Fujikura Ltd., Tokyo (JP)

(72) Inventor: Masami Watanabe, Chiba (JP)

(73) Assignee: Fujikura Ltd., Tokyo (JP)

(*) Notice: Subject to any disclaimer, the term of this patent is extended or adjusted under 35 U.S.C. 154(b) by 337 days.

(21) Appl. No.: 18/041,796

(22) PCT Filed: Oct. 11, 2021

(86) PCT No.: PCT/JP2021/037561
§ 371 (c)(1),
(2) Date: Feb. 16, 2023

(87) PCT Pub. No.: WO2022/130754
PCT Pub. Date: Jun. 23, 2022

(65) Prior Publication Data
US 2023/0296456 A1 Sep. 21, 2023

(30) Foreign Application Priority Data

Dec. 16, 2020 (JP) ................. 2020-208233

(51) Int. Cl.
*G01L 1/22* (2006.01)
(52) U.S. Cl.
CPC ................. *G01L 1/2287* (2013.01)
(58) Field of Classification Search
CPC ..................................... G01L 1/2287
See application file for complete search history.

(56) References Cited

U.S. PATENT DOCUMENTS 4,763,534 A  8/1988 Hager
6,388,556 B1 * 5/2002 Imai ............... H01C 10/106
                                                338/114
(Continued)

FOREIGN PATENT DOCUMENTS

CN      209085808 U   7/2019
JP      2002-158103 A  5/2002
(Continued)

OTHER PUBLICATIONS

International Search Report issued in corresponding International Application No. PCT/JP2021/037561 issued Nov. 9, 2021 (3 pages).
(Continued)

*Primary Examiner* — Freddie Kirkland, III
(74) *Attorney, Agent, or Firm* — Osha Bergman Watanabe & Burton LLP

(57) ABSTRACT

A pressure sensitive sensor includes: a first substrate; a resistor disposed on the first substrate; a first wiring pattern disposed on the first substrate and connected to the resistor; first comb tooth patterns disposed on the first substrate and connected to the resistor; a pusher includes a pushing part and a connecting body electrically connected to the first comb tooth patterns by pushing of the pushing part; and a second wiring pattern disposed on the first substrate and electrically connected to the connecting body by pushing of the pushing part. A material of the resistor has an electrical resistivity higher than electrical resistivities of materials of the first wiring pattern, the first comb tooth patterns, the connecting body, and the second wiring pattern. The resistor does not overlap the connecting body in a plan view.

10 Claims, 13 Drawing Sheets

(56) References Cited

U.S. PATENT DOCUMENTS

| | | | | |
|---|---|---|---|---|
| 6,392,178 | B1* | 5/2002 | Kuratani | ............... H01H 3/141 |
| | | | | 200/512 |
| 8,310,017 | B2* | 11/2012 | Mori | ....................... G01L 1/20 |
| | | | | 257/415 |
| 10,048,141 | B2* | 8/2018 | Iwase | .................... G01L 1/2206 |
| 10,545,059 | B2* | 1/2020 | Tian | .................... H10N 30/084 |
| 10,928,259 | B2* | 2/2021 | Morita | ...................... G01L 1/20 |
| 2011/0084346 | A1* | 4/2011 | Mori | ....................... G01L 1/20 |
| | | | | 257/415 |

FOREIGN PATENT DOCUMENTS

| | | | |
|---|---|---|---|
| JP | 2003-090773 | A | 3/2003 |
| JP | 4528878 | B1 | 8/2010 |
| JP | 2015-232490 | A | 12/2015 |
| JP | 5980993 | B1 | 8/2016 |
| TW | 201920921 | A | 6/2019 |

OTHER PUBLICATIONS

Office Action issued in counterpart Taiwanese Patent Application No. TW 110138849 mailed Aug. 2, 2022 (3 pages).

* cited by examiner

PRESSURE SENSITIVE SENSOR

BACKGROUND

Technical Field

The present invention relates to a pressure sensitive sensor whose resistance value changes according to the applied load.

Description of the Related Art

A conventional pressure sensitive sensor includes an upper circuit board having a pair of interdigitated comb-shaped electrodes and a lower circuit board having a disk-shaped electrode facing the comb-shaped electrodes. In this pressure sensitive sensor, at least one of the three electrodes is a pressure sensitive resistor (refer to, for example, Patent Document 1 (paragraphs [0002] to [0005], FIG. 1(a) to FIG. 1(c)). Another conventional pressure sensitive sensor includes an upper circuit board having a disc-shaped pressure-sensitive resistor and a lower circuit board having a disc-shaped counter electrode facing the pressure-sensitive resistor (refer to, for example, Patent Document 1 (paragraphs [0006] to [0008] and FIG. 2(a) to FIG. 2(c)).

PATENT DOCUMENT

PATENT DOCUMENT 1: JP 2002-158103

In any of the above pressure sensitive sensors, when the upper circuit board is pushed from above, the electrodes disposed below the pushed portion come into direct contact with each other. When the pushing force further increases, the contact area between the electrodes increases and the resistance value decreases. Because all of the pressure sensitive sensors described above detect the pushing force based on changing the area in direct contact with the resistor, good output characteristics may not be stably obtained.

SUMMARY

One or more embodiments may provide a pressure sensitive sensor capable of stably obtaining good output characteristics.

A pressure sensitive sensor according to one or more embodiments is a pressure sensitive sensor comprising: a first substrate; a resistor disposed on the first substrate; a first wiring pattern disposed on the first substrate and connected to the resistor; first comb tooth patterns disposed on the first substrate and individually connected to the resistor respectively; a pusher comprising a pushing part and a connecting body, the pushing part facing the first comb tooth patterns and being accessible to the first substrate, and the connecting body held by the pushing part and electrically connected to the first comb tooth patterns by pushing of the pushing part; and a second wiring pattern disposed on the first substrate and electrically connected to the connecting body by pushing of the pushing part, or included in the pusher and connected to the connecting body, wherein a material of which the resistor is made has an electrical resistivity higher than an electrical resistivity of a material of which the first wiring pattern is made, an electrical resistivity of a material of which the first comb tooth patterns are made, an electrical resistivity of a material of which the connecting body is made, and an electrical resistivity of a material of which the second wiring pattern is made, the resistor is arranged at a position where the resistor does not overlap with connecting body in plan view, and a resistance value between the first wiring pattern and the second wiring pattern changes according to the load applied to the pushing part.

In one or more embodiments, the first wiring pattern may be connected to one end of the resistor, and the first comb tooth patterns may be connected between one end and other end of the resistor in a state where the first comb tooth patterns are spaced apart from each other along the longitudinal direction of the resistor.

In one or more embodiments, the first comb tooth patterns may be arranged to be spaced apart from each other and substantially parallel to each other in a facing region of the first substrate facing the connecting body.

In one or more embodiments, the first comb tooth patterns may be arranged to be spaced apart from each other from an inner side to an outer side in the facing region.

In one or more embodiments, the first comb tooth patterns may be arranged concentrically around a specific point in a facing region of the first substrate facing the connecting body.

In one or more embodiments, the specific point may be a center of the facing region.

In one or more embodiments, each of the first comb tooth patterns may comprise: a detecting part disposed in the facing region; and a lead-out part electrically connecting the detecting part to the resistor.

In one or more embodiments, the detecting part of the first comb tooth patterns may include parts arranged to be spaced apart from each other and substantially parallel to each other in a facing region of the first substrate facing the connecting body.

In one or more embodiments, the detecting part of the first comb tooth patterns may include parts arranged to be spaced apart from each other from an inner side to an outer side in the facing region.

In one or more embodiments, the detecting part of the first comb tooth patterns may include parts arranged concentrically around a specific point in a facing region of the first substrate facing the connecting body.

In one or more embodiments, a tip portion of the second wiring pattern may be an enlarged part wider than other portion of the second wiring pattern.

In one or more embodiments, the first comb tooth patterns may be disposed on the first substrate so that the first comb tooth pattern is located closer to a specific point in a facing region of the first substrate facing the connecting body as a connecting position of the first comb tooth pattern with the resistor is closer to other end of the resistor.

In one or more embodiments, the resistor may be formed by printing and curing a carbon paste or a carbon ink containing carbon particles.

In one or more embodiments, the pressure sensitive sensor may comprise a third wiring pattern disposed on the first substrate and connected to other end of the resistor, and a material of which the resistor is made may have an electrical resistivity higher than an electrical resistivity of a material of which the third wiring pattern is made.

In one or more embodiments, the pressure sensitive sensor may comprises: a third wiring pattern disposed on the first substrate and connected to other end of the resistor; a second comb tooth pattern disposed on the first substrate to face the connecting body and connected to the first wiring pattern; and a third comb tooth pattern disposed on the first substrate to face the connecting body and connected to the third wiring pattern, wherein a material of which the resistor is made may have an electrical resistivity higher than an electrical resistivity of a material of which the third wiring pattern is made, an electrical resistivity of a material of which the second comb tooth pattern is made, and an electrical resistivity of a material of which the third comb tooth pattern is made, and the first to third comb tooth patterns may be arranged to be spaced apart from each other and substantially parallel to each other in a facing region of the first substrate facing the connecting body.

In one or more embodiments, the pusher may comprise: a second substrate having the connecting body; and a spacer interposed between the first substrate and the second substrate, the spacer may have an opening through which the connecting body and the first comb tooth patterns face each other.

In one or more embodiments, the second wiring pattern may be disposed on the first substrate so that the second wiring pattern faces the connecting body.

In one or more embodiments, the specific point may be a tip portion of the second wiring pattern.

In one or more embodiments, the second wiring pattern may be connected to the resistor.

In one or more embodiments, the first and third wiring patterns may apply a predetermined voltage to the resistor, and the second wiring pattern may output a voltage according to the load applied to the pushing part.

In one or more embodiments, the resistance value between the first wiring pattern and the second wiring pattern may change by changing the number of first comb-tooth patterns electrically connected to the connecting body in accordance with the load applied to the pushing part.

In one or more embodiments, the resistor is arranged at a position where the resistor does not overlap with the contacting body in plan view, and the connecting body is electrically connected to the comb tooth patterns connected to the resistor in accordance with the pushing of the pushing part. Therefore, in one or more embodiments, because the resistor does not contact the connecting body, it is possible to provide a pressure sensitive sensor capable of stably obtaining a good output characteristic.

DETAILED DESCRIPTION OF THE EMBODIMENTS

Hereinafter, embodiments will be described with reference to the drawings.

First Example

Figure 1:
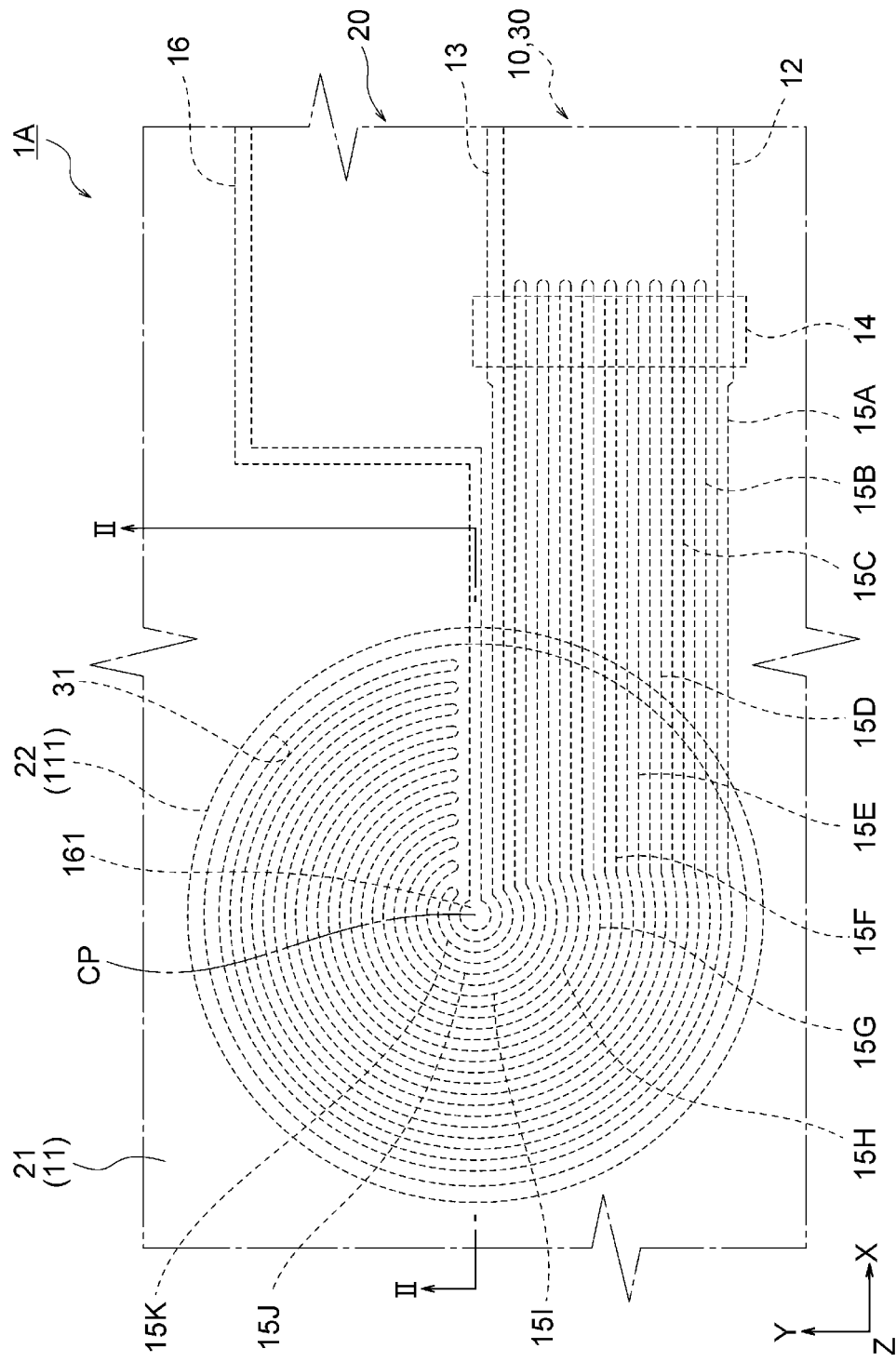
FIG. 1 is a plan view showing a pressure sensitive sensor in one or more embodiments.
Figure 2:
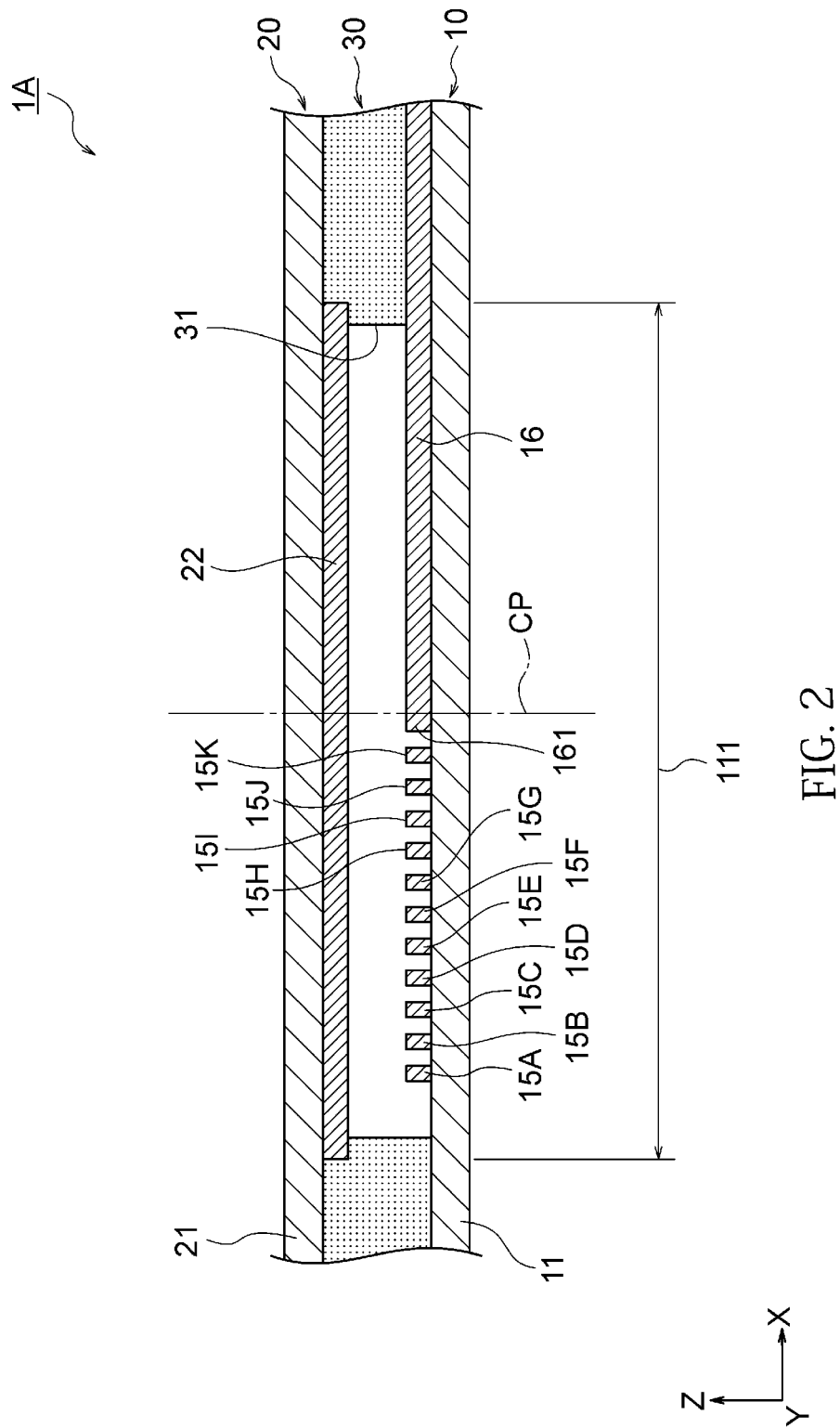
FIG. 2 is a cross-sectional view taken along II-II line of FIG. 1.
Figure 3:
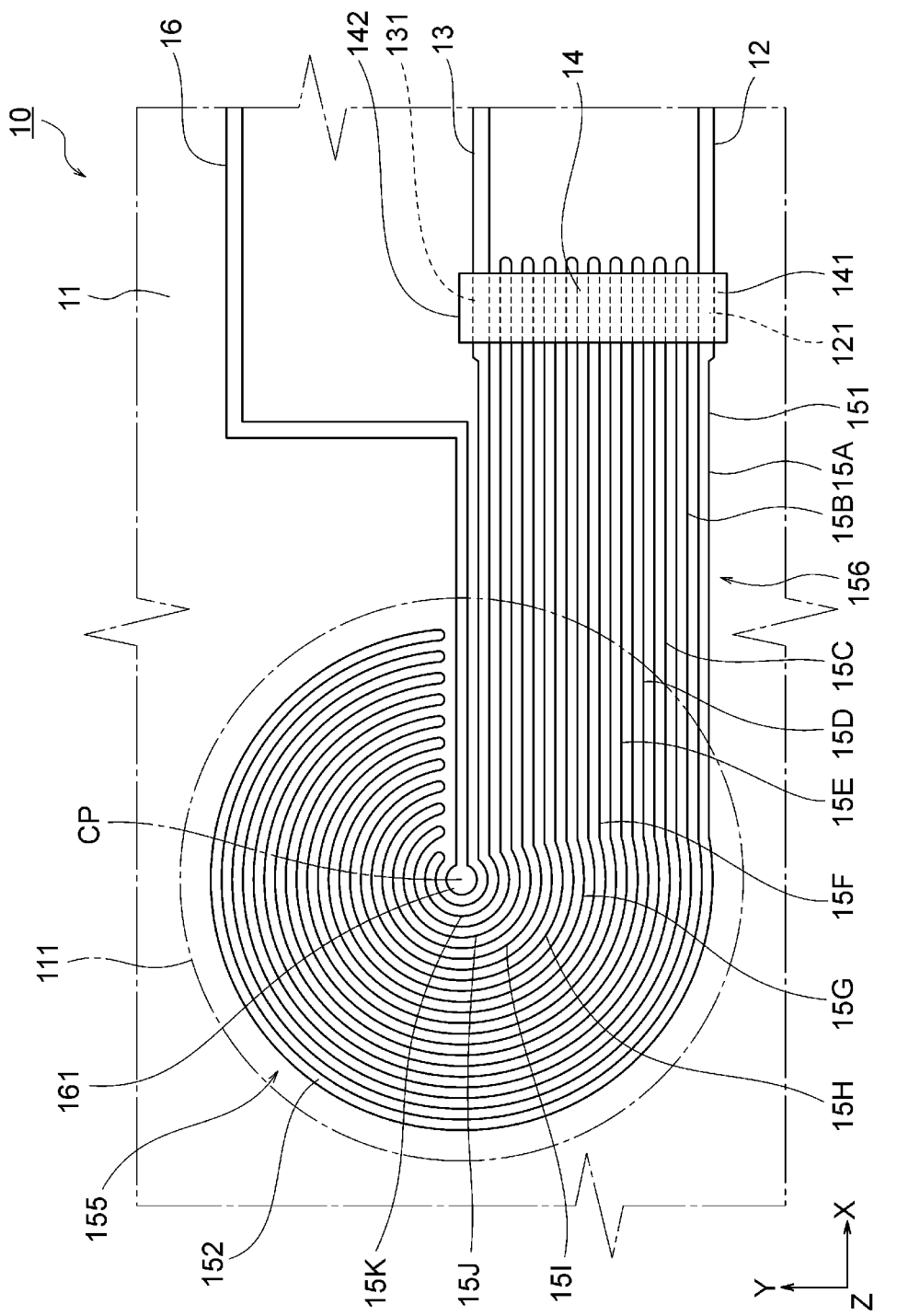
FIG. 3 is a plan view showing a lower membrane board in one or more embodiments.
Figure 4:
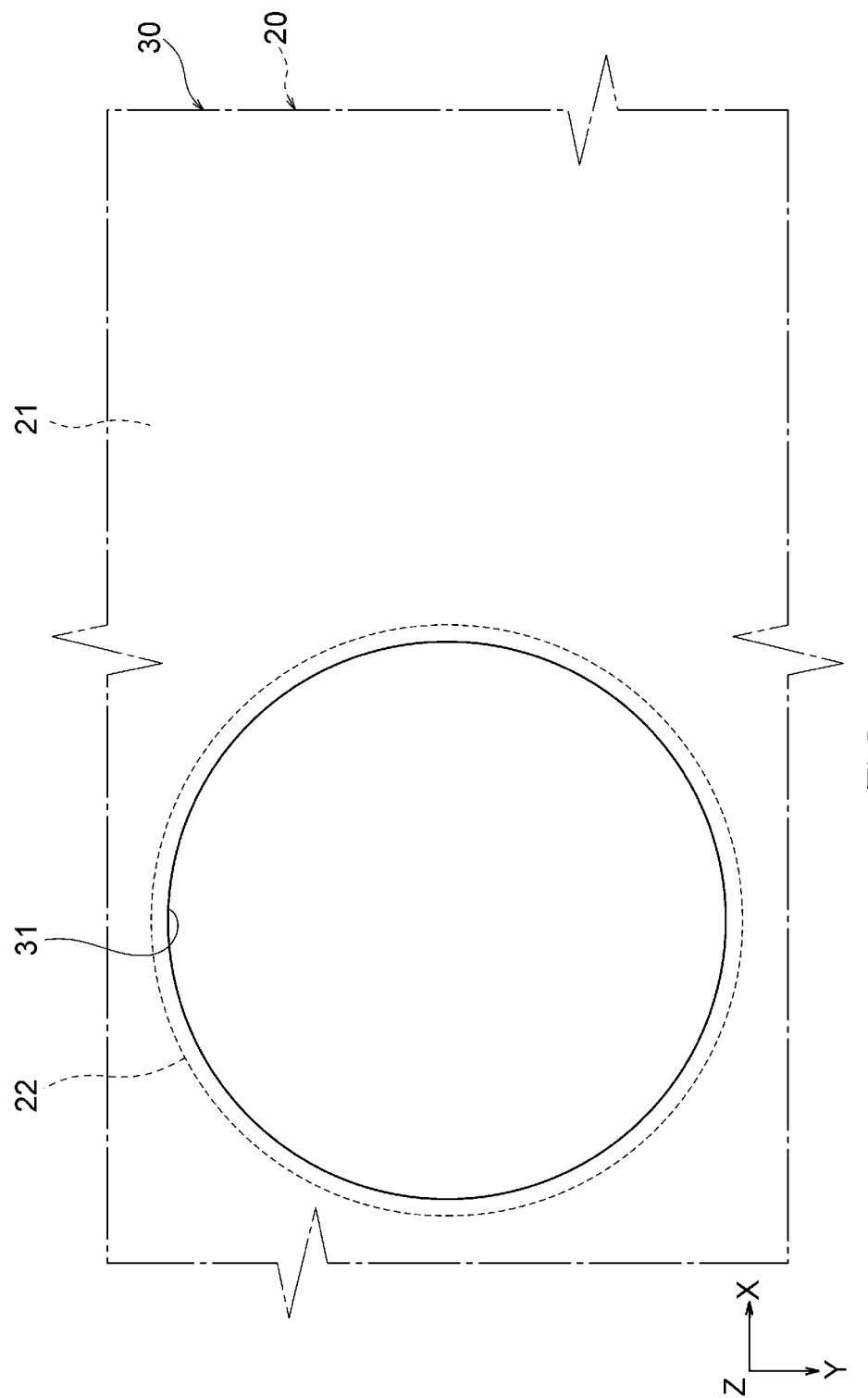
FIG. 4 is a bottom view showing the spacer and the upper membrane board in one or more embodiments.

FIG. 1 is a plan view showing a pressure sensitive sensor in one or more embodiments, and FIG. 2 is a cross-sectional view taken along II-II line of FIG. 1. FIG. 3 is a plan view showing a lower membrane board in one or more embodiments, and FIG. 4 is a bottom view showing the spacer and the upper membrane board in one or more embodiments.

The pressure sensitive sensor 1A of one or more embodiments is a sensor in which the magnitude of the resistance value changes according to the magnitude of the applied load. As shown FIG. 1 to FIG. 4, the pressure sensitive sensor 1A includes a lower membrane board 10, an upper membrane board 20 and a spacer 30. The upper membrane board 20 and the spacer 30 in one or more embodiments corresponds to an example of the "pusher" in one or more embodiments, and the spacer 30 in one or more embodiments corresponds to an example of the "spacer" in one or more embodiments.

As shown in FIG. 3, the lower membrane board 10 is a wiring board including a substrate 11, wiring patterns 12 and 13, a resistor 14, comb tooth patterns 15A to 15K, and a wiring pattern 16.

The substrate 11 in one or more embodiments corresponds to an example of the "first substrate" in one or more embodiments, the wiring pattern 12 in one or more embodiments corresponds to an example of the "first wiring pattern" in one or more embodiments, the wiring pattern 13 in one or more embodiments corresponds to an example of the "third wiring pattern" in one or more embodiments, the wiring pattern 16 in one or more embodiments corresponds to an example of the "second wiring pattern" in one or more embodiments, the comb tooth pattern 15A in one or more embodiments corresponds to an example of the "second comb tooth pattern" in one or more embodiments, the comb tooth patterns 15B to 15J in one or more embodiments correspond to an example of the "first comb tooth patterns" in one or more embodiments, the comb tooth pattern 15K in one or more embodiments corresponds to an example of the "third comb tooth pattern" in one or more embodiments.

The substrate 11 is a film-like member made of a material having flexibility and electrical insulation. As the material constituting the substrate 11, for example, a resin material or the like can be exemplified, and more specifically, polyethylene terephthalate (PET) or polyethylene naphthalate (PEN) can be exemplified. The substrate 11 may not have flexibility.

The wiring patterns 12 and 13 are formed by printing a conductive paste on an upper surface of the substrate 11 and solidifying (curing) the conductive paste. The conductive paste is constituted by mixing conductive particles and a binder resin with water or a solvent and various additives. The conductive paste constituting the wiring patterns 12 and 13 is a low resistance conductive paste having a relatively small electric resistance value. The method of forming the wiring patterns 12 and 13 is not particularly limited to the above. For example, instead of the conductive paste, the wiring patterns 12 and 13 may be formed by etching the metal foil.

As specific examples of the conductive particle, silver, copper, nickel, tin, bismuth, zinc, indium, palladium and alloys thereof can be exemplified. As specific examples of the binder resin, acrylic resin, polyester resin, epoxy resin, vinyl resin, urethane resin, phenol resin, polyimide resin, silicone resin, fluororesin, or the like can be exemplified. As the solvent contained in the conductive paste, α-terpineol, butyl carbitol acetate, butyl carbitol, 1-decanol, butyl cell solve, diethylene glycol monoethyl ether acetate, and tetradecane, or the like can be exemplified.

Although not particularly limited, in one or more embodiments, as the low-resistance conductive paste, a silver paste containing silver as the main component of the conductive particles, or a copper paste containing copper as the main component of the conductive particles is used. As a conductive particle contained in the conductive paste, a metal salt may be used. As the metal salt, salts of the above-mentioned metals can be exemplified. The binder resin may be omitted from the above-mentioned conductive paste. Instead of the above-mentioned conductive paste, conductive ink may be used.

Although not particularly limited, either a contact coating method or a non-contact coating method may be used as the method for applying the conductive paste. As specific examples of the contact coating method, screen printing, gravure printing, offset printing, gravure offset printing, flexographic printing, or the like can be exemplified. On the other hand, as specific examples of the non-contact coating method, ink jet printing, spray coating, dispensing coating, jet dispensing, or the like can be exemplified. Although not particularly limited, as the heat source for curing the conductive paste, an electrothermal oven, an infrared oven, a far infrared oven (IR), a near infrared oven (NIR), a laser irradiation apparatus, or the like can be exemplified, and the heat source may be a heat treatment that combines these.

In one or more embodiments, the wiring pattern 12 linearly extends along the X direction of the drawing. The end portion 121 of the wiring pattern 12 is covered with the resistor 14, and the comb tooth pattern 15A is connected to the end portion 121. Similarly, the wiring pattern 13 linearly extends along the X direction of the drawing. The end portion 131 of the wiring pattern 13 is covered with the resistor 14, and the comb tooth pattern 15K is connected to the end portion 131. Although not particularly shown, one wiring pattern 12 is connected to the power supply, while the other wiring pattern 13 is connected to the ground. As long as the planar shape of the wiring patterns 12 and 13 is linear, the planar shape is not limited to the straight shape as described above.

The end portion 121 of the wiring pattern 12 and the end portion 131 of the wiring pattern 13 are arranged apart from each other along the Y direction of the drawing. The resistor 14 is disposed along the Y direction of the drawing, the end portion 121 of the wiring pattern 12 is covered with one end portion 141 of the resistor 14, and the end portion 131 of the wiring pattern 13 is covered with the other end portion 142 of the resister 14. Therefore, the one wiring pattern 12 and the other wiring pattern 13 are electrically connected via the resistor 14. The resistor 14 is disposed at a position away from a facing region 111 (described later) of the substrate 11 so that the resistor 14 does not to overlap with the connecting body 22 of the upper membrane board 20 in plan view.

Similarly to the above-mentioned wiring patterns 12 and 13, the resistor 14 is also formed by printing a conductive paste on the upper surface of the substrate 11 and curing the conductive paste. The conductive paste constituting the resistor 14 is a high-resistance conductive paste having a high electrical resistance value as compared with the above-mentioned low-resistance conductive paste. The conductive paste constituting the resistor 14 contains conductive particles having an electrical resistivity higher than the electrical resistivity of the conductive particles of the conductive paste constituting the above-mentioned wiring patterns 12 and 13. That is, the resistor 14 is made of a material having the higher electrical resistivity than the electrical resistivity of the material constituting the wiring patterns 12 and 13, and the resistance value of the resistor 14 is sufficiently higher than the resistance value of the wiring patterns 12 and 13 to the extent that the resistance value of the wiring patterns 12 and 13 can be ignored. Specifically, the resistance value of the resistor 14 is 10 times or more with respect to the resistance value of the wiring patterns 12 and 13, and preferably 100 times or more with respect to the resistance value of the wiring patterns 12 and 13. The electrical resistivity of the material constituting the resistor 14 is 10 times or more, preferably 100 times or more, with respect to the electrical resistivity of the material constituting the wiring patterns 12 and 13.

As a specific example of such a high-resistance conductive paste, a carbon paste can be exemplified. As specific examples of the conductive particle contained in the conductive paste constituting the resistor 14, carbon-based materials such as graphite, carbon black (furnace black, acetylene black, Ketjen black), carbon nanotubes, carbon nanofibers, or the likes can be exemplified.

Similarly to the above-mentioned wiring patterns 12 and 13, a plurality of (11 in the first example) comb tooth patterns 15A to 15K are formed by printing and curing the low-resistance conductive paste. That is, the comb tooth patterns 15A to 15K are made of a material having the lower electrical resistivity than the electrical resistivity of the material constituting the resistor 14, and the resistance value of the resistor 14 is sufficiently higher than the resistance value of the comb tooth patterns 15A to 15K to the extent that the resistance value of the comb tooth patterns 15A to 15K can be ignored. Specifically, the resistance value of the resistor 14 is 10 times or more with respect to the resistance value of the comb tooth patterns 15A to 15K, and preferably 100 times or more with respect to the resistance value of the comb tooth patterns 15A to 15K. The electrical resistivity of the material constituting the resistor 14 is 10 times or more, preferably 100 times or more, with respect to the electrical resistivity of the material constituting the comb tooth patterns 15A to 15K. The method of forming the comb tooth patterns 15A to 15K is not particularly limited to the above. For example, instead of the conductive paste, the comb tooth patterns 15A to 15K may be formed by etching the metal foil.

Similarly to the above-mentioned wiring patterns 12 and 13, the wiring pattern 16 is formed by printing and curing the low-resistance conductive paste. That is, the wiring pattern 16 is made of a material having the lower electrical resistivity than the electrical resistivity of the material constituting the resistor 14, and the resistance value of the resistor 14 is sufficiently higher than the resistance value of the wiring pattern 16 to the extent that the resistance value of the wiring pattern 16 can be ignored. Specifically, the resistance value of the resistor 14 is 10 times or more with respect to the resistance value of the wiring pattern 16, and preferably 100 times or more with respect to the resistance value of the wiring pattern 16. The electrical resistivity of the material constituting the resistor 14 is 10 times or more, preferably 100 times or more, with respect to the electrical resistivity of the material constituting the wiring pattern 16. The method of forming the wiring pattern 16 is not particularly limited to the above. For example, instead of the conductive paste, the wiring pattern 16 may be formed by etching the metal foil.

In one or more embodiments, each of the comb-tooth-patterns 15A to 15K includes a straight portion 151 and an arc portion 152. The straight portion 151 of each of the comb tooth patterns 15A to 15K extends linearly along the X direction of the drawing, and a part of the straight portion 151 is located outside the facing region 111. On the other hand, the arc portion 152 of each of the comb tooth patterns 15A to 15K is located in the facing region 111 and electrically connected to the resistor 14 via the straight portion 151. Here, the facing region 111 is a circular region of the upper surface of the substrate 11 facing the connecting body 22 of the upper membrane board 20 in plan view.

In one or more embodiments, a part of the comb-tooth-patterns 15A to 15K located in the facing region 111 functions as a detecting part 155 that detects a load applied to the pressure sensitive sensor 1A, and the detecting part 155 includes the arc portions 152. On the other hand, a part of the comb-tooth-patterns 15A to 15K located outside the facing region 11 functions as a lead-out part 156 that electrically connects the detecting part 155 to the resistor 14, and the lead-out part 156 includes a part of the straight portions 151.

The plurality of comb tooth patterns 15A to 15K are electrically insulated from each other on the substrate 11 by ensuring a space between the comb tooth patterns 15A to 15K except for being electrically connected via the resistor 14. Although the number of the comb-tooth patterns is not particularly limited as long as it is multiple, as will be described later, it is possible to improve the resolution of the output of the pressure sensitive sensor 1A as the number of the comb tooth patterns 15A-15K is increased and the pitch of the comb-tooth patterns is narrower.

Although the comb tooth patterns 15A to 15K have substantially the same width in one or more embodiments, the widths of the comb tooth patterns 15A to 15K are not limited to this, and the widths of the comb tooth patterns 15A to 15K may be different from each other. Although each of the comb tooth patterns 15A to 15K has substantially the same width over the entire length, the width of each of the comb tooth patterns 15A to 15K is not limited to this, and each of the comb tooth patterns 15A to 15K may have partially differing width.

The straight portions 151 of the comb tooth patterns 15A and 15K located at both ends among the eleven comb tooth patterns 15A to 15K are respectively connected to the end portions 121 and 131 of the wiring patterns 12 and 13. The remaining nine straight portions 151 of the comb tooth patterns 15B to 15J are covered with the resistor 14, and the comb tooth patterns 15B to 15J are connected to the resistor 14. The comb tooth patterns 15A and 15K at both ends may not be directly connected to the wiring patterns 12 and 13 but may be embedded in the resistor 14 similarly to the comb tooth patterns 15B to 15J.

The straight portions 151 of the inner comb-tooth patterns 15B to 15J are connected between one end portion 141 and the other end portion 142 of the resistor 14 in a state where the straight portions 151 are spaced apart from each other along the longitudinal direction of the resistor 14 (the Y direction of the drawing). The comb tooth patterns 15B to 15J are individually and independently connected to the resistors 14 respectively. That is, the resistor 14 is interposed between the ends of the straight portions 151 of the comb tooth patterns 15B to 15J. The resistor 14 is also interposed between the end portion 121 of the wiring pattern 12 and the end of the straight portion 151 of the comb tooth pattern 15B, and the resistor 14 is also interposed between the end portion 131 of the wiring pattern 13 and the end of the straight portion 151 of the comb tooth pattern 15J.

Although the comb tooth patterns 15B to 15J are connected to the resistor 14 at substantially equal intervals in one or more embodiments, as long as the comb tooth patterns 15B to 15J are spaced apart from each other and connected to the resistor 14, the arrangement of the comb tooth patterns 15B to 15J is not limited to this. For example, although not particularly illustrated, as the position of the comb tooth pattern in the facing region is closer to the outside, the connection interval of the comb-tooth pattern with the resistor may be narrower.

The straight portions 151 of the eleven comb tooth patterns 15A to 15K linearly extend from the resistor 14 to the facing region 111 along the X direction of the drawing and extend substantially parallel to be separated apart from each other. Although the wiring pattern 16 also extends substantially parallel to the straight portion 151 of the comb tooth pattern 15K to be separated from the straight portion 151 of the comb tooth pattern 15K, the wiring pattern 16 extends to the center CP of the facing region 111 and has a tip portion 161 at the center CP.

The tip portion 161 is an enlarged portion having a circular shape with a diameter larger than the width of the other portion of the wiring pattern 16 (for example, the portion of the wiring pattern 16 other than the tip portion 161 in the facing region 111). Since the wiring pattern 16 has the enlarged portion 161 at the tip, it is possible to stabilize load detection at the start of pushing. The planar shape of the enlarged portion 161 is not limited to a circular shape, and may be, for example, an elliptical shape, an oval shape, a rectangular shape, a polygonal shape, or the like. The wiring pattern 16 may not have the enlarged portion at its tip.

On the other hand, the comb tooth patterns 15A to 15K extend substantially parallel to be separated apart from each other so that the comb tooth patterns 15A to 15K surround the tip portion 161 of the wiring pattern 16 in the facing region 111. More specifically, in one or more embodiments, each of the comb tooth patterns 15A to 15K has an arc portion 152 that extends in an arc shape to surround the tip portion 161 of the wiring pattern 16 in the facing region 111. The arc portions 152 of the comb tooth patterns 15A to 15K are arranged concentrically with the tip portion 161 of the wiring pattern 16 as the center.

Although the arc portions 152 of the comb tooth patterns 15B to 15J are arranged at substantially equal intervals in one or more embodiments, the arrangement of the arc portions 152 is not particularly limited to this as long as an interval is ensured between the arc portions 152. For example, although not particularly shown, as the position of the comb tooth pattern is closer to the outside in the facing region 111, the interval between the arc portions of the comb tooth patterns may be narrower.

Although the case where the pushing start position (the position where connecting body 22 starts contacting the lower membrane board 10) of the pushing element (described later) substantially coincides with the center CP of the facing region 111 is described in one or more embodiments, the pushing start position may be a position other than the center CP of the facing region 111 and can be set arbitrarily within the facing region 111. In this case, the comb tooth patterns are arranged concentrically around the pushing start position other than the center CP of the facing region 111. The pushing start position corresponds to an example of the "specific point" in one or more embodiments.

Although the wiring pattern 16 described above is electrically insulated from the innermost comb tooth pattern 15K on the substrate 11, the wiring pattern 16 is not particularly limited to this, and the wiring pattern 16 may have a connection line that is connected to the comb tooth pattern 15K. By electrically connecting the wiring pattern 16 to the comb pattern 15K through the connection line, it is possible to set the output of the pressure sensitive sensor 1A in the non-pressing state to a desired value.

Figure 5:
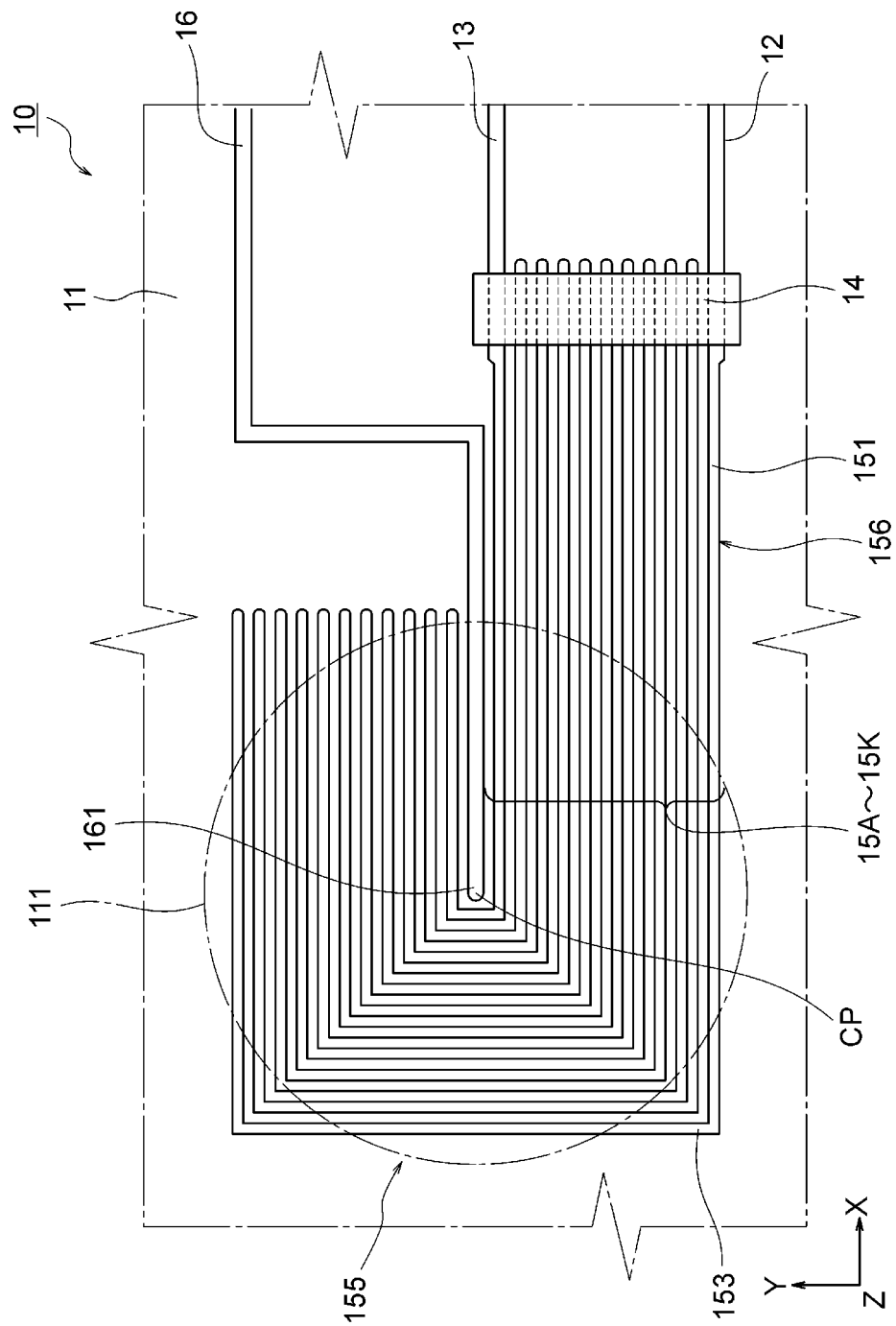
FIG. 5 is a plan view showing a modification of the comb tooth patterns in one or more embodiments.

Further, the shape of the detecting part of the comb tooth pattern is not particularly limited to the above shape as long as it is a shape in which the comb tooth patterns are arranged from the inside toward the outside to be separated apart from each other in the facing region. Although not particularly limited, for example, the shape of the detecting part of the comb tooth patterns may be a shape as shown in FIG. 5. FIG. 5 is a plan view showing a modification of the comb tooth patterns in one or more embodiments.

For example, as shown in FIG. 5, the comb tooth patterns 15A to 15K may have bent portions 153 in the facing region 111 instead of the arc portions 152. The bent portion 153 has a substantially U-shape bent at substantially right angles. The bent portions 153 of the comb tooth patterns 15A to 15K are arranged substantially parallel to be separated apart from each other so that the bent portions 153 surround the tip portion 161 of the wiring pattern 16. The bent portions 153 extend from the inside toward the outside in the facing region 111 to be separated apart from each other.

Also in the modification shown in FIG. 5, the pushing start position of the pushing element can be set to any position within the facing area 111 other than the center CP. In this case, the comb tooth patterns are arranged substantially parallel to be separated apart from each other so that the comb tooth patterns surround the pushing start position other than the center CP of the facing region 111.

Although the comb tooth patterns 15A to 15K extend in a straight line outside the facing region 111, the planar shape of the comb tooth pattern outside the facing region is not particularly limited to this as long as it is linear. Further, the comb tooth patterns 15A to 15K are arranged substantially parallel even in the outside of the facing region 111 in one or more embodiments, but not particularly limited to this, the comb tooth patterns may not be arranged substantially parallel in the outside of the facing region.

As shown in FIG. 4, the second membrane board 20 includes a substrate 21 and a connecting body 22. The substrate 21 in one or more embodiments corresponds to an example of the "second substrate" in one or more embodiments.

Similarly to the above-mentioned substrate 11, the substrate 21 is a film-like member made of a material having flexibility and electrical insulation. As the material constituting the substrate 21, for example, a resin material or the like can be exemplified, and more specifically, polyethylene terephthalate (PET) or polyethylene naphthalate (PEN) can be exemplified. A metal film may be used as the substrate 21. In this case, the substrate 21 may have the function of the connecting body 22, that is, the substrate 21 may also serve as the connecting body 22.

As shown in FIG. 1 and FIG. 4, the connecting body 22 has a circular planar shape corresponding to the shape of the arc portions 152 of the comb tooth patterns 15A to 15K of the lower membrane board 10. More specifically, the connecting body 22 has a circular shape with a diameter larger than the diameter of the arc portion 152 of the outermost comb tooth pattern 15A. The connecting body 22 has a diameter larger than that of the opening 31 of the spacer 30 in one or more embodiments, but not particularly limited to this, the connecting body 22 may have a diameter equal to or less than the inner diameter of opening 31. The connecting body 22 is formed on the substrate 21 so that the connecting body 22 faces the arc portions 152 of the comb tooth patterns 15A to 15K and the center of the connecting body 22 overlaps with the tip portion 161 of the wiring pattern 16 when the membrane boards 10 and 20 are laid on each other via the spacer 30.

Similarly to the above-mentioned wiring patterns 12 and 13, the connecting body 22 is formed by printing and curing the low-resistance conductive paste. That is, the connecting body 22 is made of a material having the lower electrical resistivity than the electrical resistivity of the material constituting the resistor 14, and the resistance value of the resistor 14 is sufficiently higher than the resistance value of the connecting body 22 to the extent that the resistance value of the connecting body 22 can be ignored. Specifically, the resistance value of the resistor 14 is 10 times or more with respect to the resistance value of the connecting body 22, and preferably 100 times or more with respect to the resistance value of the connecting body 22. The electrical resistivity of the material constituting the resistor 14 is 10 times or more, preferably 100 times or more, with respect to the electrical resistivity of the material constituting the connecting body 22.

The connecting body 22 may include a protective layer that covers the above-described layer formed by printing and curing the low-resistance conductive paste. The protective layer is formed by formed by printing and curing a high-resistance conductive paste having a high electrical resistance value as compared with the above-mentioned low-resistance conductive paste. As a specific example of such a high-resistance conductive paste, a carbon paste can be exemplified.

Similarly to the above-mentioned substrate 11 and 21, the spacer 30 is a film-like member made of a material having flexibility and electrical insulation. As the material constituting the spacer 30, for example, a resin material or the like can be exemplified, and more specifically, polyethylene terephthalate (PET) or polyethylene naphthalate (PEN) can be exemplified.

As shown in FIG. 1 and FIG. 4, the spacer 30 has a circular opening 31 corresponding to the shape of the arc portions 152 of the comb tooth patterns 15A to 15K of the lower membrane board 10. More specifically, the opening 31 has a circular shape with an inner diameter larger than the diameter of the arc portion 152 of the outermost comb tooth pattern 15A. Although not particularly limited, the distance between the opening 31 and the arc portion 152 of the outermost comb tooth pattern 15A in plan view is preferably equal to or greater than the thickness of the spacer 30. The openings 31 are formed at positions corresponding to the arc portions 152 of the comb tooth patterns 15A to 15K of the lower membrane board 10 and the connecting body 22 of the upper membrane board 20. When the membrane boards 10 and 20 are laid on each other via the spacers 30, the arc portions 152 of the comb tooth patterns 15A to 15K and the connecting body 22 face each other through the opening 31.

The planar shape of the opening 31 is not limited to a circular shape, and the planar shape of the opening 31 may be, for example, an elliptical shape, an oval shape, a rectangular shape, a polygonal shape, or the like. Further, the shapes of the connecting body 22 and the detecting part 155 of the comb tooth patterns 15A to 15K is not particularly limited to the above, and, for example, the shapes of the connecting body 22 and the detecting part 155 may be shaped according to the shape of the opening 31. In one or more embodiments, the part of the substrate 21 of the upper membrane board 20 that faces the opening 31 corresponds to an example of the "pushing part" in one or more embodiments.

The lower membrane board 10 and the upper membrane board 20 are laid on each other via a spacer 30. Specifically, the upper surface of the substrate 11 of the lower membrane board 10 and the lower surface of the spacer 30 are attached to each other via an adhesive layer (not shown), and the upper surface of the spacer 30 and the lower surface of the substrate 21 of the upper membrane board 20 are attached to each other via an adhesive layer (not shown).

At this time, as shown in FIG. 1, the center CP of the facing region 111 of the lower membrane board 10 substantially coincides with the center of the opening 31 of the spacer 30 in plan view. Further, in plan view, the center CP overlaps with the tip portion 161 of the wiring pattern 16 of the lower membrane board 10 and also substantially coincides with the center of the connecting body 22 of the upper membrane board 20. The connecting body 22 of the upper membrane board 20 faces the tip portion 161 of the wiring pattern 16 of the lower membrane board 10 and the arc portions 152 of the comb tooth patterns 15A to 15K through the opening 31 of the spacer 30.

As shown in FIG. 2, the distance is ensured between the connecting body 22 and the tip portion 161 of the wiring pattern 16 by the spacer 90, and the distance is also ensured between the connecting body 22 and the comb tooth patterns 15A to 15K by the spacer 30. As will be described later, the substrate 21 of the upper membrane board 20 is deformed by pushing of the pushing element. By this deformation, the connecting body 22 and the tip portion 161 of the wiring pattern 16 contact each other and are electrically connected to each other, and the connecting body 22 and the comb tooth patterns 15A to 15K contact each other and are electrically connected to each other.

In one or more embodiments, although the thickness of the spacer 30 is set so that the connecting body 22 does not contact the comb tooth patterns 15A to 15K and the wiring pattern 16 at the time of non-pushing, the thickness of the spacer 30 is not particularly limited to this. The thickness of the spacer 30 may be set so that the connecting body 22 is always contact with the comb tooth patterns 15A to 15K and the wiring pattern 16.

Here, in one or more embodiments, "electrically connecting" the connecting body and the comb tooth pattern means a state where the resistance value between the connecting body and the comb tooth pattern is equal to or less than a predetermined threshold value and does not include a state where the connecting body and the comb tooth pattern are simply in contact with each other at the time of non-pushing as described above. Similarly, in one or more embodiments, "electrically connecting" the connecting body and the wiring pattern means a state where the resistance value between the connecting body and the wiring pattern is equal to or less than a predetermined threshold value and does not include a state where the connecting body and the wiring pattern are simply in contact with each other at the time of non-pushing as described above.

Figure 6:
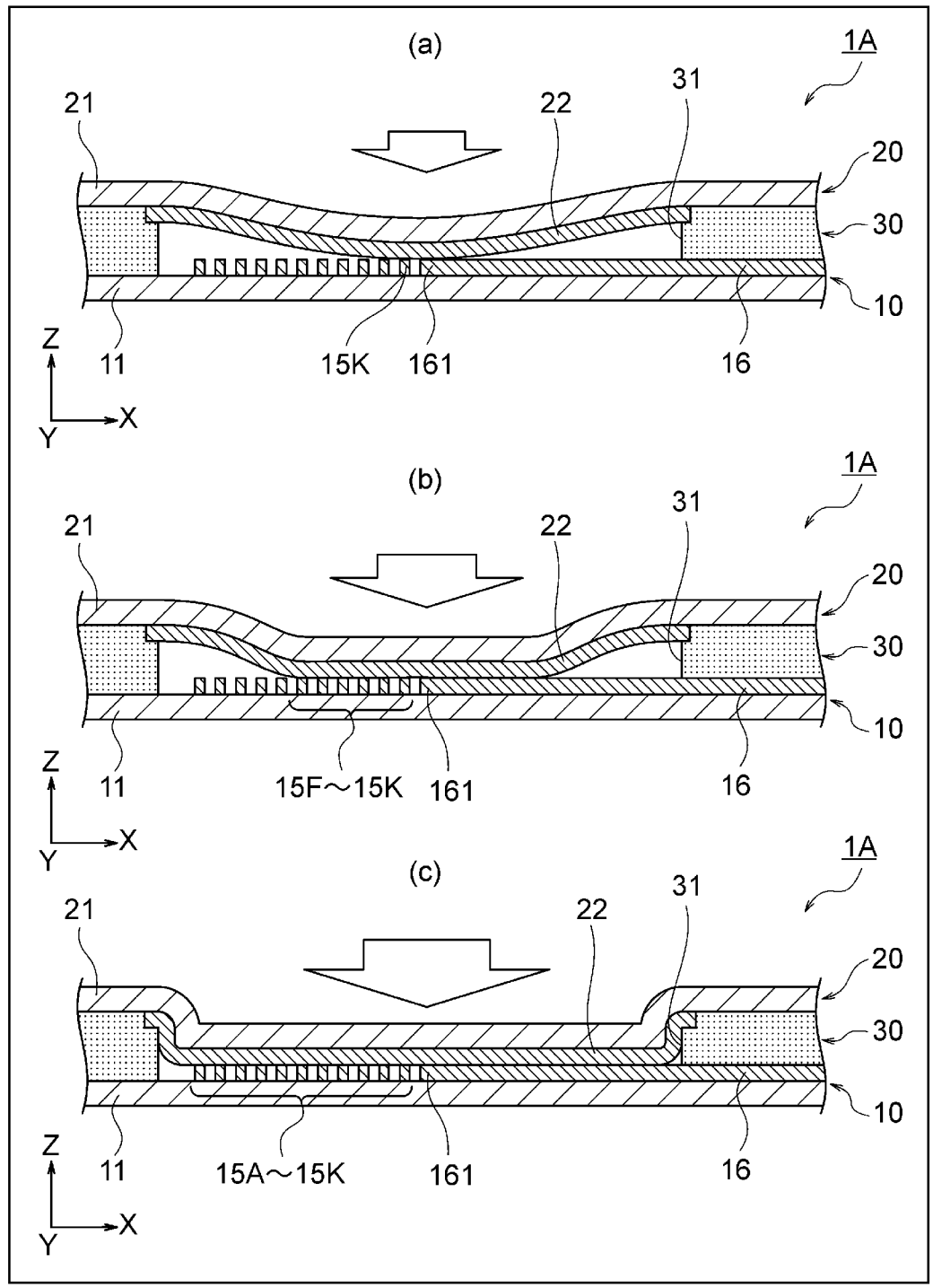
FIG. 6 shows the operation of the pressure sensitive sensor in one or more embodiments, (a) in FIG. 6 is a diagram showing a state in which the connecting body has started to contact the comb tooth patterns, (b) in FIG. 6 is a diagram showing a state in which the applied load is increased from that in than (a) in FIG. 6, and (c) in FIG. 6 is a diagram showing a state in which the applied load is further increased from that in (b) in FIG. 6.

The operation of the pressure sensitive sensor 1A described above will be described with reference to (a) in FIG. 6 to (c) in FIG. 6, and (a) in FIG. 6 to (c) in FIG. 6 are cross-sectional views showing the operation of the pressure sensitive sensor in one or more embodiments. Specially, (a) in FIG. 6 is a diagram showing a state in which the connecting body has started to contact the comb tooth patterns, (b) in FIG. 6 is a diagram showing a state in which the applied load is increased from that in than (a) in FIG. 6, and (c) in FIG. 6 is a diagram showing a state in which the applied load is further increased from that in (b) in FIG. 6.

When the pressure sensitive sensor 1A is pushed by a pushing element (not shown), as shown in (a) in FIG. 6, the substrate 21 of the upper membrane board 20 begins to dent from the center of the opening 31 of the spacer 30. As a result, first, the connecting body 22 disposed on the lower surface of the substrate 21 contacts the tip portion 161 of the wiring pattern 16 of the lower membrane board 10, and the connecting body 22 contacts only the innermost comb tooth pattern 15K. At this time, as described above, one wiring pattern 12 connected to the resistor 14 is applied with a power supply voltage (for example, 5 [V]), while the other wiring pattern 13 connected to the resistor 14 is grounded, and the innermost comb tooth pattern 15K is directly connected to the other wiring pattern 13. Therefore, the wiring pattern 16 detects a voltage of approximately the same potential as the ground, and a potential difference (for example, 5 [V]) between the power supply voltage and the detected voltage of the wiring pattern 16 is output by a multimeter (not shown) or the like connected to the wiring patterns 12 and 16.

Here, although not particularly illustrated, the pushing element is a member made of, for example, a resin material. The pushing element is supported above the upper membrane board 20 to be able to move toward and away from the upper surface of the substrate 21 of the upper membrane board 20. In one or more embodiments, the pushing element is arranged so that the center of the pushing element substantially coincides with the center of the opening 31 of the spacer 30 (the center CP of the facing region 111 of the substrate 11 of the lower membrane board 10). When the upper membrane board 20 is pushed by the pushing element, the connecting body 22 first contacts the tip portion 161 of the wiring pattern 16 and the innermost comb tooth pattern 15K. A specific example of such a pushing element is an operation key of a controller. The pushing element may have a portion protruding downward like a pushing member 40 (refer to FIG. 12) described later. Alternatively, the pushing element may be the operator's finger.

Then, as the pushing force (applied load) of the pushing element increases, the recessed portion of the substrate 21 of the upper membrane board 20 is wider, and the connection target of the connecting body 22 spreads to the outer comb tooth patterns 15J to 15B. As a result, since the distance between one end 141 of the resistor 14 and the connecting position of the connection target is shortened, the resistance value between the wiring patterns 12 and 16 is lowered.

In this way, in one or more embodiments, since the connecting position of the resistor 14 with the wiring pattern 16 via the connecting body 22 and the comb-teeth patterns 15A to 15K changes by changing the outermost comb-teeth pattern among the comb-teeth patterns contacting the connecting body 22, the distance between one end 141 of the resistor 14 and the connecting position changes. That is, in the pressure sensitive sensor 1A of one or more embodiments, since the resistance length (resistance value) of the resistor 14 changes according to the pushing force of the pushing element, the voltage detected by the wiring pattern 16 changes according to the pushing force of the pushing element.

For example, as shown in (b) in FIG. 6, when the applied load is increased from the state of (a) in FIG. 6 and the connecting body 22 contacts the comb tooth patterns 15J to 15F in addition to the wiring pattern 16 and the comb tooth pattern 15K, the wiring pattern 16 detects a voltage approximately half the power supply voltage, a potential difference (for example, 2.5 [V]) between the power supply voltage and the detected voltage of the wiring pattern 16 is output by a multimeter or the like.

In one or more embodiments, since the resistance value between the wiring patterns 12 and 16 changes according to the connecting position of the comb tooth patterns 15B to 15J connected to the wiring pattern 16 via the connector 22 in the resistor 14, the output of the pressure sensitive sensor 1A has a stepped shape. Therefore, as the number of comb tooth patterns is increased and the pitch of the comb tooth pattern is narrower, it is possible to improve the resolution of the output of the pressure sensor 1A.

When the applied load further increases from the state of (b) in FIG. 6 and the pressure sensitive sensor 1A is sufficiently pushed, as shown in (c) in FIG. 6, the connecting body 22 contacts the outermost comb tooth pattern 15A in addition to the wiring pattern 16 and the comb tooth patterns 15K to 15B. At this time, since the outermost comb tooth pattern 15A is directly connected to one of the wiring patterns 12 connected to the power supply voltage, the wiring pattern 16 detects a voltage having substantially the same potential as the power supply voltage, and the potential difference (for example, 0 [V]) between the power supply voltage and the detected voltage of the wiring pattern 16 is output by a multimeter or the like.

When the pushing of the pushing element is released, the operation opposite to the above is performed. That is, as the applied load decreases, the recessed portion of the substrate 21 of the upper membrane board 20 is smaller, and the connection target of the connecting body 22 narrows to the inner comb tooth patterns 15B to 15J. As a result, since the distance between one end 141 of the resistor 14 and the connecting position of the connection target increases, the resistance value between the wiring patterns 12 and 16 increases.

The obtaining method of the output of the pressure sensitive sensor 1A is not particularly limited to the above. For example, the resistance value between the wiring patterns 12 and 16 may be measured by using a resistance measuring device.

As described above, in one or more embodiments, the resistor 14 is arranged at a position that the resistor 14 does not overlap with the connecting body 22 in plan view, and the connecting body 22 is electrically connected to the comb tooth patterns 15B to 15J connected to the resistor 14 according to the pushing of the pushing element. Therefore, in one or more embodiments, since the resistor 14 does not contact the connector 22, it is possible to stably obtain good output characteristics of the pressure sensitive sensor 1A.

In particular, the resistance value of a resistor made of carbon, which has a high electrical resistivity, tends to be unstable as the distance of the resistor is longer. In addition, the resistance value of this resistor tends to be unstable due to reproducibility of contact. Therefore, when using the change in the contact area between the connecting body and the resistor, it is difficult to make the output characteristics (applied load—resistance value) of the pressure sensitive sensor close to the ideal (linear) output, and the output may vary for each pushing.

On the other hand, in one or more embodiments, the comb tooth patterns 15B to 15J with low resistance are arranged concentrically around the tip portion 161 of the wiring pattern 16 in the facing region 111, the comb tooth patterns 15B to 15J are spaced apart from each other and are connected to the high resistance resistor 14, and the position of the comb tooth patterns 15B to 15J connected to the wiring pattern 16 via the connecting body 22 changes according to the applied load, thereby the resistance length (resistance value) of the resistor 14 changes.

In one or more embodiments, the outermost comb tooth pattern 15A is directly connected to one wiring pattern 12, and the innermost comb tooth pattern 15K is directly connected to the other wiring pattern 13. Therefore, the maximum value of the output of the pressure sensitive sensor 1A can be made equal to the power supply voltage, and the minimum value of the output can be made equal to the ground.

Furthermore, in one or more embodiments, since all the wiring patterns 12, 13 and 16 to be connected to the outside are disposed on the upper surface of the same substrate 11, it is sufficient to mount the connector only on the upper surface of the substrate 11, and it is possible to simplify the configuration of the pressure sensitive sensor 1A.

Second Example

Figure 7:
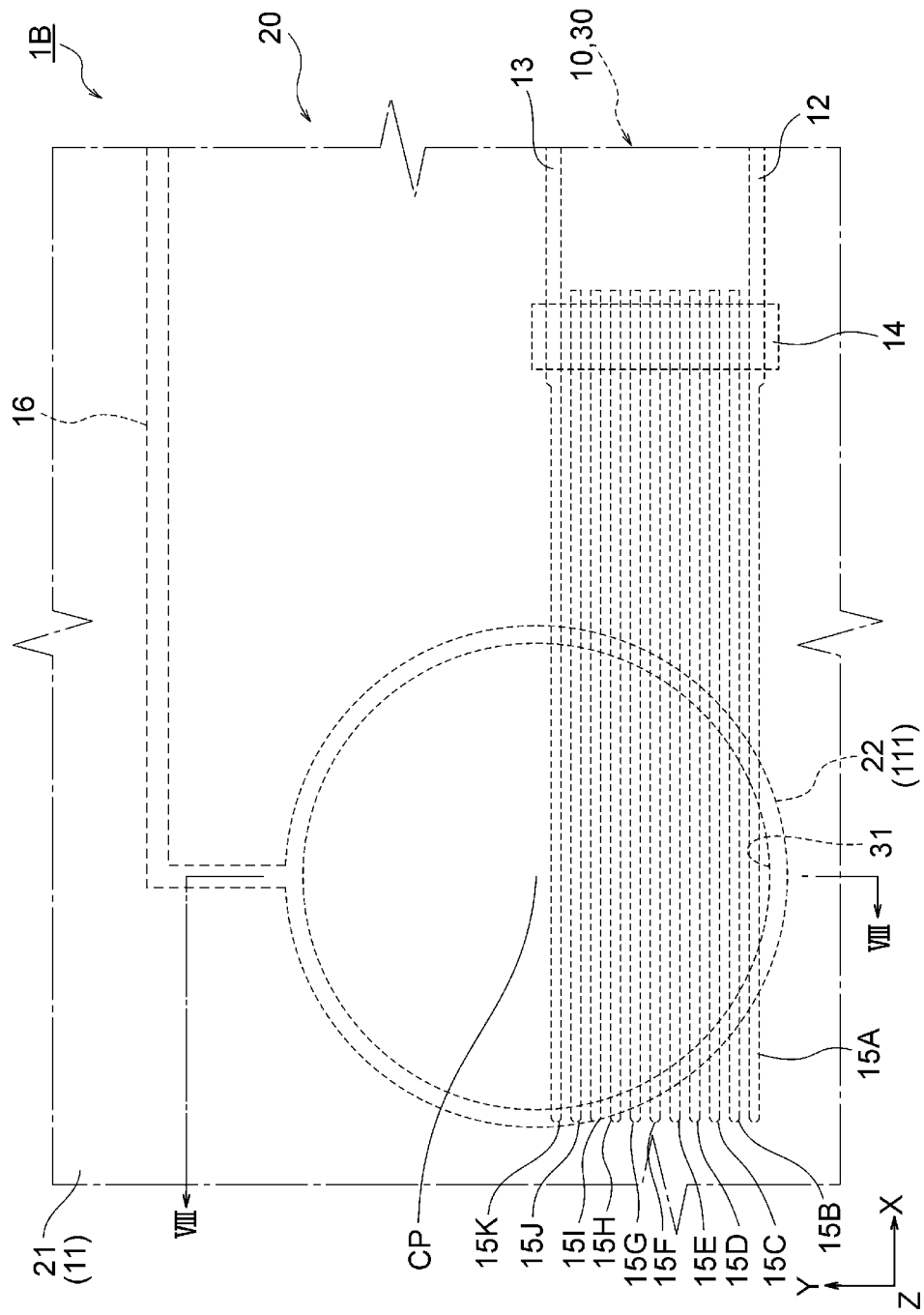
FIG. 7 is a plan view showing a pressure sensitive sensor in one or more embodiments.
Figure 8:
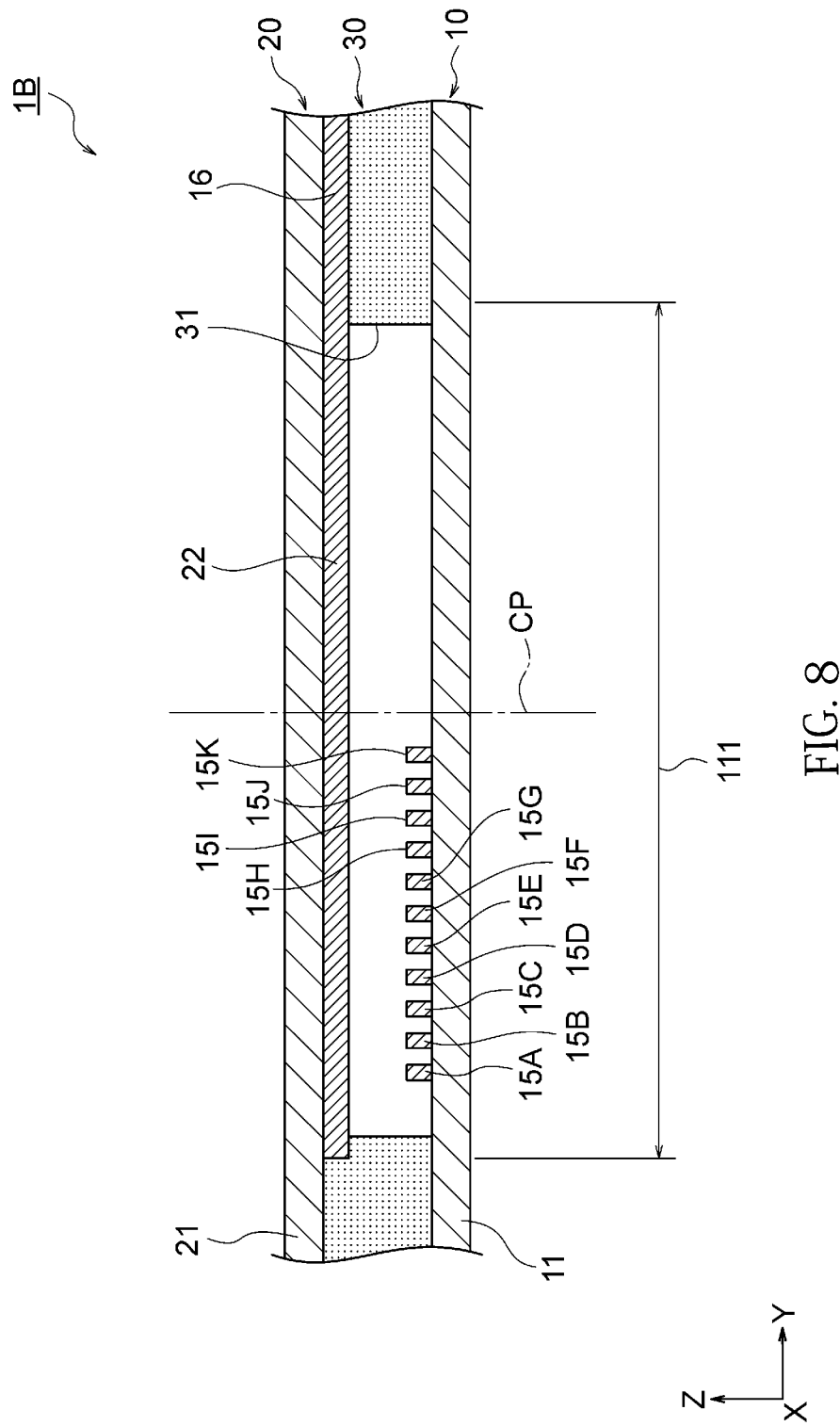
FIG. 8 is a cross-sectional view taken along VIII-VIII line of FIG. 7.
Figure 9:
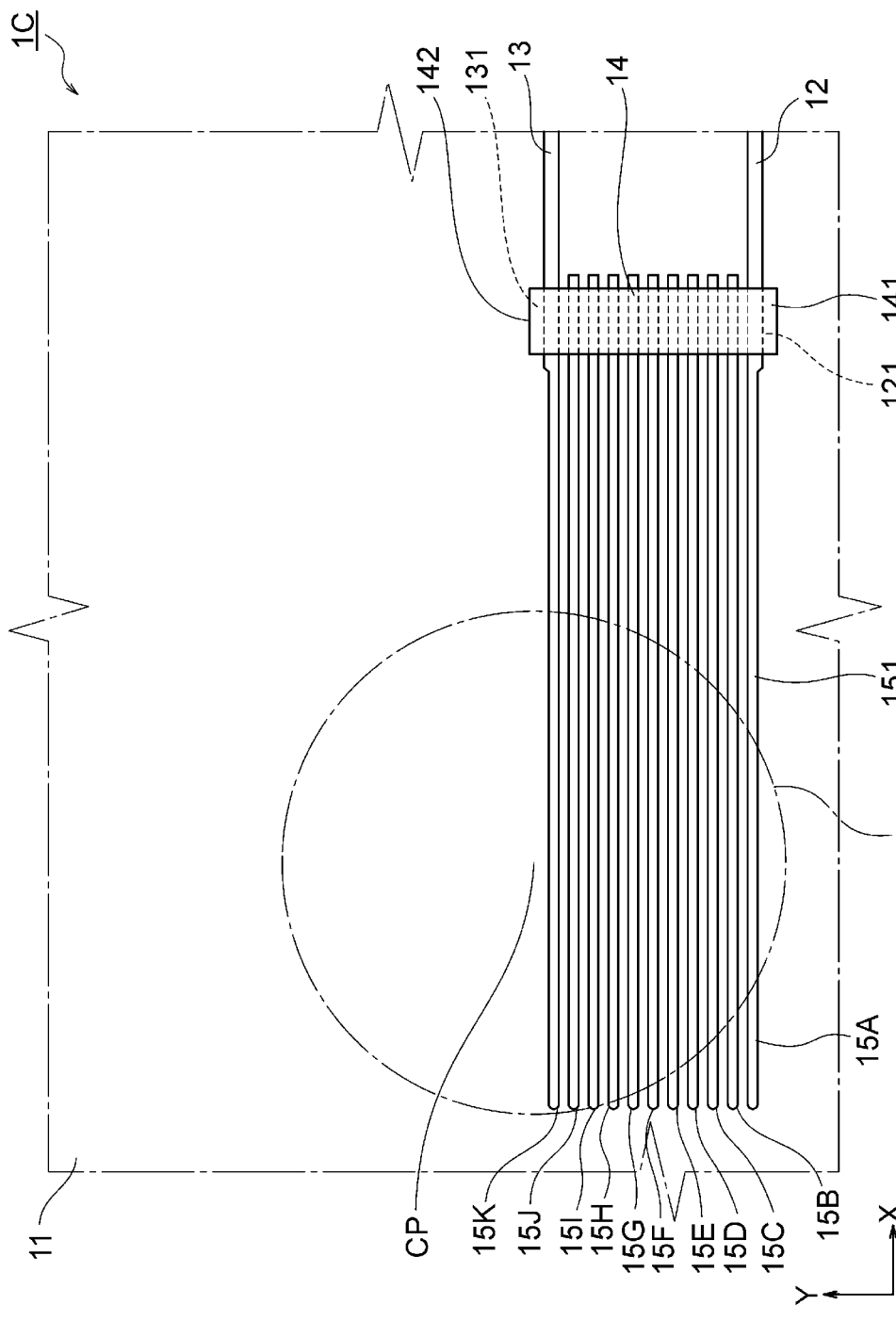
FIG. 9 is a plan view showing a lower membrane board in one or more embodiments.
Figure 10:
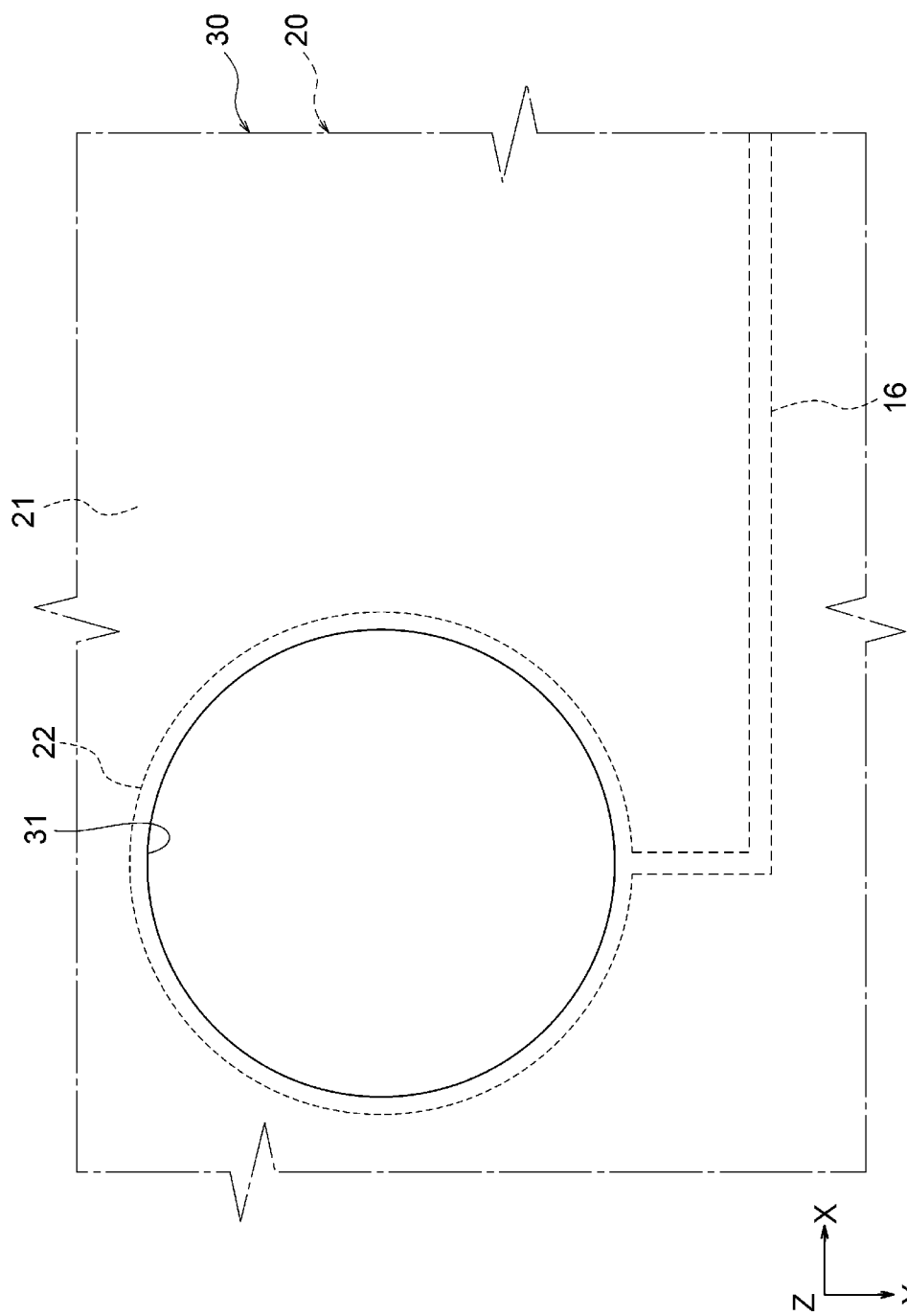
FIG. 10 is a bottom view illustrating a spacer and an upper membrane board in one or more embodiments.

FIG. 7 is a plan view showing a pressure sensitive sensor in one or more embodiments, FIG. 8 is a cross-sectional view taken along VIII-VIII line of FIG. 7, FIG. 9 is a plan view showing a lower membrane board in one or more embodiments, and FIG. 10 is a bottom view illustrating a spacer and an upper membrane board in one or more embodiments.

As shown in FIG. 7 to FIG. 10, although the pressure sensitive sensor 1B of the present example is different from the pressure sensitive sensor 1A of the first example in the points where (1) the wiring pattern 16 is disposed on the upper substrate 21 and is directly connected to the connecting body 22 and (2) the arc portions 152 are not included and the straight comb tooth patterns 15A to 15K pass through the facing region 111, other configurations of the pressure sensitive sensor 1B are the same as the first example. Hereinafter, the pressure sensitive sensor 1B in the second example will be described only with respect to the differences from the first example, and the same components as those in the first example will be denoted by the same reference numerals, and descriptions thereof will be omitted.

As shown in FIG. 8 and FIG. 10, the wiring pattern 16 in one or more embodiments is formed on the lower surface of the substrate 21 of the upper membrane board 20. The wiring pattern 16 is formed integrally with the connecting body 22 and is directly connected to the connecting body 22. When a metal film is used as the substrate 21, the substrate 21 may have the function of the connecting body 22, or the substrate 21 may have the function of the wiring pattern 16.

As shown in FIG. 7 and FIG. 9, the comb-tooth patterns 15A to 15K do not have the arc portion 152 but include the straight portion 151 only, and the straight portions 151 penetrate the facing region 111. In one or more embodiments, the straight portions 151 of the comb tooth patterns 15A to 15K are disposed in lower half area (−Y side of the drawing) of the facing region 111, and the straight portions 151 are arranged substantially parallel to be separated apart from each other outward from the center CP of the facing region 111.

Also in one or more embodiments, the pushing start position of the pushing element can be set to any position within the facing area 111 other than the center CP. In this case, the straight portions of the comb tooth patterns are arranged substantially parallel to be separated apart from each other outward from the pushing start position other than the center CP of the facing region 111.

Similarly to the first example, in the pressure-sensitive sensor 1B of the present example, since the connecting position of the resistor 14 with the wiring pattern 16 via the connecting body 22 and the comb tooth patterns 15A to 15K changes according to the magnitude of the pushing force (applied load) of the pushing element (not shown), the resistance length (resistance value) of resistor 14 changes.

Similarly to the first example, also in the present example, the resistor 14 is arranged at a position that the resistor 14 does not overlap with the connecting body 22 in plan view, and the connecting body 22 is electrically connected to the comb tooth patterns 15B to 15J connected to the resistor 14 according to the pushing of the pushing element. Therefore, in one or more embodiments, since the resistor 14 does not contact the connecting body 22, it is possible to stably obtain good output characteristics of the pressure sensitive sensor 1B.

Further, in one or more embodiments, the comb tooth patterns 15A and 15K at both ends are directly connected to the wiring patterns 12 and 13 respectively. Therefore, it is possible to make the maximum value of the output of the pressure sensitive sensor 1B equal to the power supply voltage.

Third Example

Figure 11:
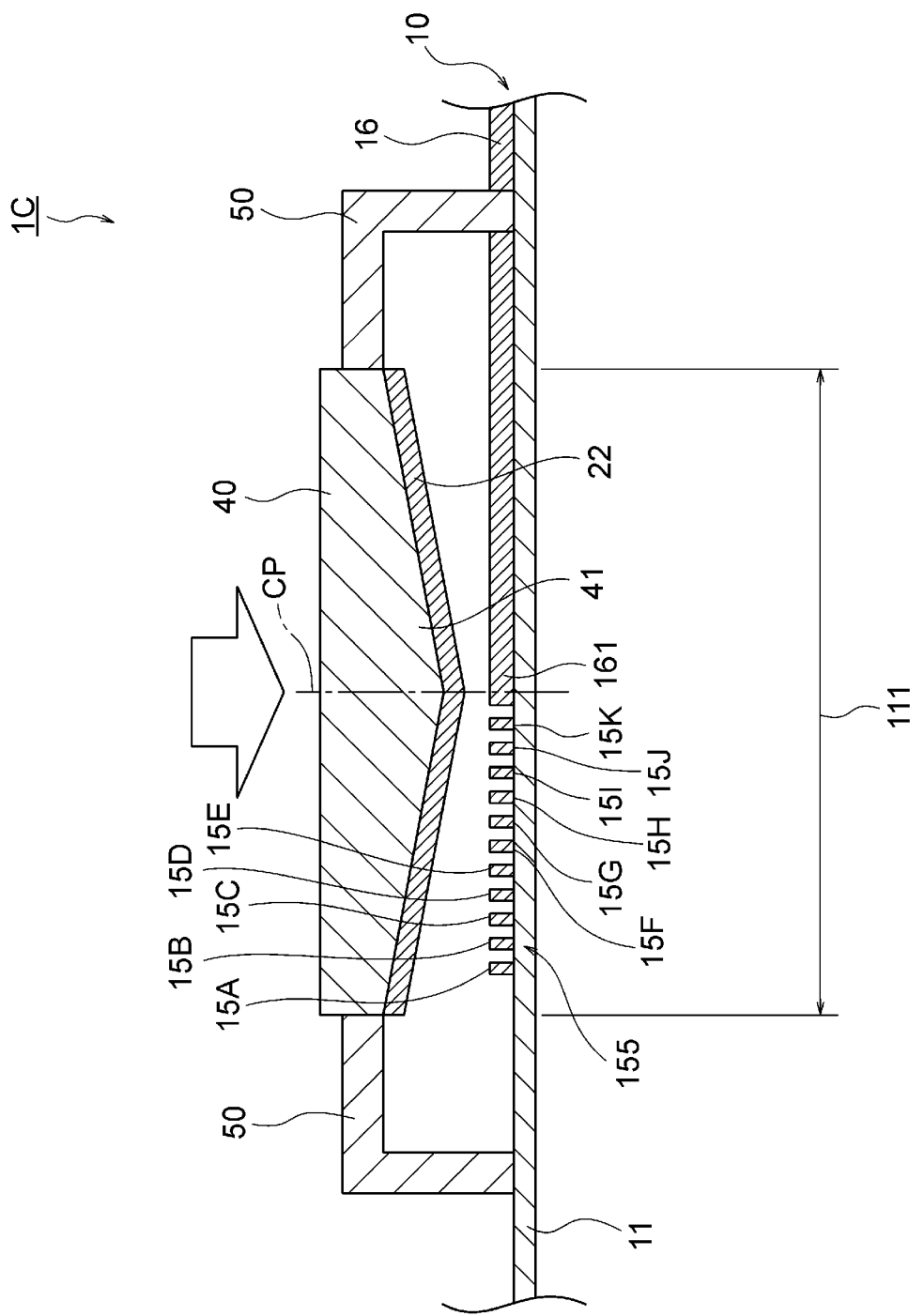
FIG. 11 is a cross-sectional view showing a pressure sensitive sensor in one or more embodiments.

FIG. 11 is a cross-sectional view showing a pressure sensitive sensor in a third example.

As shown in FIG. 11, although the pressure sensitive sensor 1C of the present example is different from the pressure sensitive sensor 1A of the first example in the points where (1) a pushing member 40 is included in place of the upper substrate 21 and (2) a support member 50 is included in place of the spacer 30, other configurations of the pressure sensitive sensor 1C are the same as the first example. Hereinafter, the pressure sensitive sensor 1C in the third example will be described only with respect to the differences from the first example, and the same components as those in the first example will be denoted by the same reference numerals, and descriptions thereof will be omitted.

The pushing member 40 is made of, for example, an electrically insulating elastic material such as silicone rubber. The pushing member 40 has a conical tapered portion 41 at its lower portion, and the tapered portion 41 projects downward in a convex shape. In one or more embodiments, the facing region 111 of the substrate 11 of the lower membrane board 10 is a region of the substrate 11 facing the connecting body 22.

Although the pushing member 40 has a circular planar shape corresponding to the arc portions 152 of the comb tooth patterns 15A to 15K in one or more embodiments, the planar shape of the pushing member 40 is not particularly limited to this. For example, the planar shape of the pushing member 40 may have a strip-like planar shape corresponding to a part of the arc portions 152 of the comb tooth patterns 15A to 15K. In this case, it is sufficient that the pushing member 40 partially overlaps with all the comb tooth patterns 15A to 15K.

The pushing member 40 itself may have conductivity by forming the pushing member 40 with an elastic material having conductivity such as, for example, conductive rubber. In this case, the pushing member 40 may have the function of the connecting body 22, or the connecting body 22 independent of the pressing member 40 may be formed on the tapered portion 41. Alternatively, only the tapered portion 41 of the pushing member 40 may have conductivity.

The support member 50 is also made of an elastic material such as silicone rubber. The support member 50 is disposed around the facing region 111 of the substrate 11 of the lower membrane board 10. The pushing member 40 is supported by the supporting member 50 so that the tapered portion 41 faces the detecting part 155 of the comb tooth patterns 15A to 15K and the tip portion 161 of the wiring patterns 16. Also in one or more embodiments, the center CP of the facing region 111 overlaps with the tip portion 161 of the wiring pattern 16 and substantially coincides with the center of the tapered portion 41 of the pushing member 40 in plan view.

In one or more embodiments, a both-end support structure in which the support members 50 are connected to both sides of the pushing member 40 are employed, but not particularly limited to this. A one-end support structure in which the support member 50 is connected only to one side of the pushing member 40 may be employed.

The connecting body 22, the pushing member 40, and the supporting member 50 in one or more embodiments correspond to an example of the "pusher" in one or more embodiments, and the pushing member 40 in one or more embodiments corresponds to an example of the "pushing part" in one or more embodiments.

Figure 12:
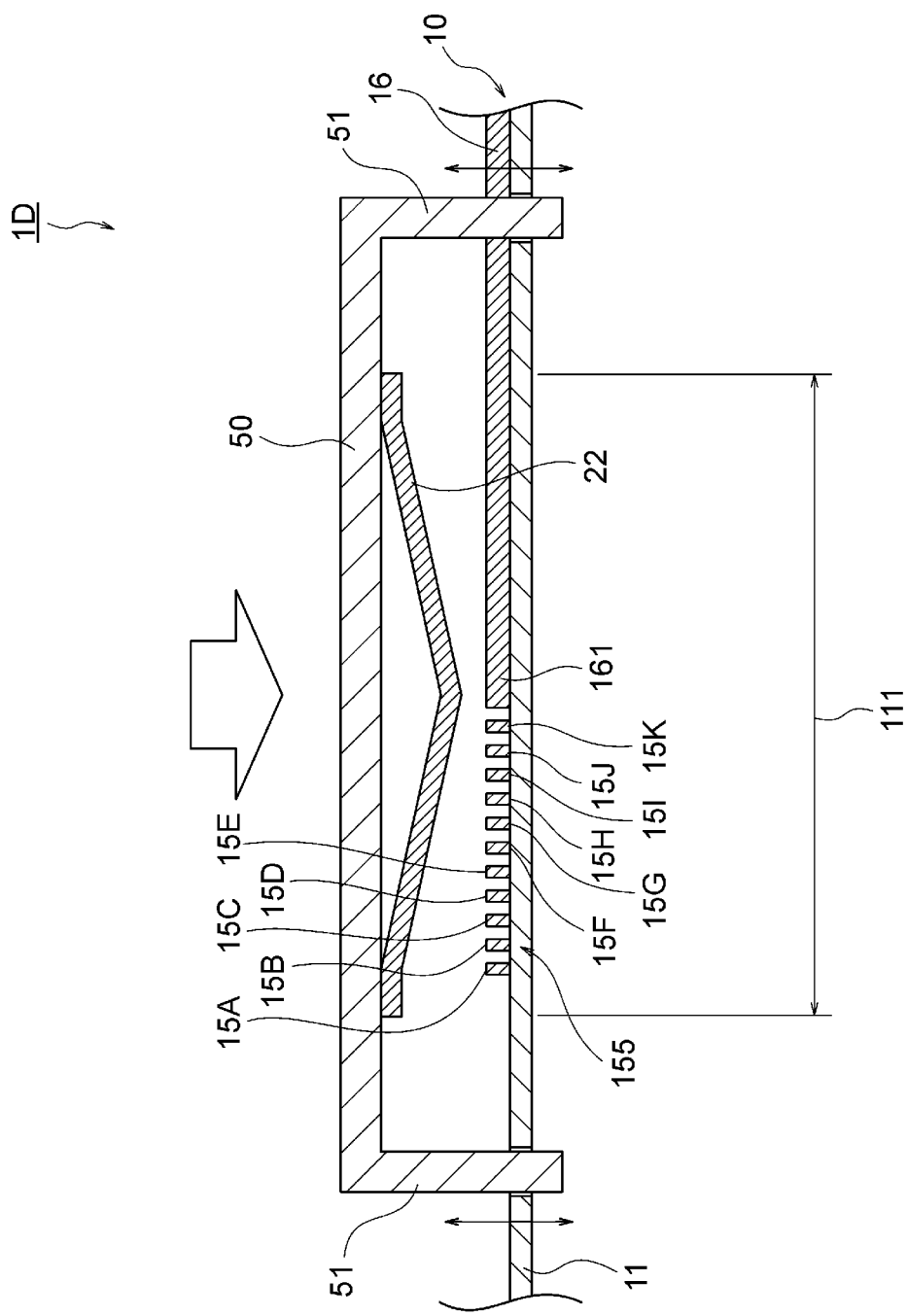
FIG. 12 is a cross-sectional view showing a modification of the pressure sensitive sensor in one or more embodiments.

FIG. 12 is a cross-sectional view showing a modification of the pressure sensitive sensor in the third example.

As in the pressure sensitive sensor 1D shown in FIG. 12, the support member 50 may be disposed to be movable up and down with respect to the substrate 11, and the connecting body 22 may be disposed on the lower surface of the support member 50. More specifically, the tip of the leg portion 51 of the support member 50 is inserted into the through hole of the substrate 11, and the support member 50 is supported by the substrate 11 via an elastic body (not shown) such as a coil spring. The connecting body 22 has a strip-shaped planar shape corresponding to a part of the detecting part 155 of the comb-tooth patterns 15A to 15K, and the connecting body 22 is formed of a substantially V-shaped metallic piece whose center protrudes downward. The connecting body 22 is fixed to the support member 50 at one end thereof.

The planar shape of the connecting body 22 is not particularly limited to the above, and may be, for example, a circular planar shape corresponding to the shape of the detecting part 155 of the comb tooth patterns 15A to 15K. Also, the cross-sectional shape of the connecting body 22 is not particularly limited to the above. For example, although the connecting body 22 is fixed at one end to the support member 50 in FIG. 12, since it is necessary that the position of the connecting body 22 is not relatively shifted, both ends may not be fixed to the support member 50 as long as the position of the connecting body 22 is not shifted. Moreover, although the support member 50 has a both-end support structure where the support member 50 has leg portions 51 at both ends thereof, the structure of the support member 50 is not particularly limited to this. The support member 50 may have a one-end support structure where the support member 50 has a leg 51 at only one end.

In one or more embodiments, the connecting body 22 and the support member 50 correspond to an example of the "pusher" in one or more embodiments, and the part of the support member 50 facing the connecting body 22 corresponds to an example of the "pushing part" in one or more embodiments.

Returning to FIG. 11, similarly to the first example, also in the pressure-sensitive sensor 1C of the present example, since the connecting position of the resistor 14 with the wiring pattern 16 via the connecting body 22 and the comb tooth patterns 15A to 15K changes according to the magnitude of the pushing force (applied load) of the pushing member 40, the resistance length (resistance value) of resistor 14 changes.

Similarly to the first example, also in the present example, the resistor 14 is arranged at a position that the resistor 14 does not overlap with the connecting body 22 in plan view, and the connecting body 22 is electrically connected to the comb tooth patterns 15B to 15J connected to the resistor 14 according to the pushing of the pushing member 40. Therefore, in one or more embodiments, since the resistor 14 does not contact the connecting body 22, it is possible to stably obtain good output characteristics of the pressure sensitive sensor 1C.

It should be noted that the embodiments described above are described to facilitate understanding of the present disclosure and are not described to limit the present disclosure. It is therefore intended that the elements disclosed in the above embodiments include all design modifications and equivalents to fall within the technical scope of the present disclosure.

For example, the wiring pattern 16 is formed on the upper surface of the substrate 11 of the lower membrane board 10 in the above-described first example, but not particularly limited to this. Specifically, similarly to the second example, in the embodiments shown in FIG. 1 to FIG. 4, the wiring pattern 16 may be formed on the lower surface of the substrate 21 of the upper membrane board 20, and the wiring pattern 16 may be directly connected to the connecting body 22.

Further, the wiring pattern 16 is formed on the lower surface of the substrate 21 of the upper membrane board 20 and the wiring pattern 16 is directly connected to the connecting body 22 in the second example, but it is not particularly limited to this. Specifically, similarly to the first example, in the embodiments shown in FIG. 7 to FIG. 10, the wiring pattern 16 may be formed on the upper surface of the substrate 11 of the lower membrane board 10.

Also in the third example, the wiring pattern 16 is formed on the upper surface of the substrate 11 of the lower membrane board 10, but not particularly limited to this. Specifically, in the embodiments shown in FIG. 11 and FIG. 12, the wiring pattern 16 may be formed on the support member 50 and the wiring pattern 16 may be directly connected to the connecting body 22.

Although the wiring pattern 12 is connected to the power supply, the wiring pattern 13 is connected to the ground, and the detection voltage of the wiring pattern 16 is obtained, thereby the resistance value of the resistor 14 is detected in the above-described first example, a circuit configuration for detecting the resistance value of the resistor 14 is not particularly limited to this.

Figure 13:
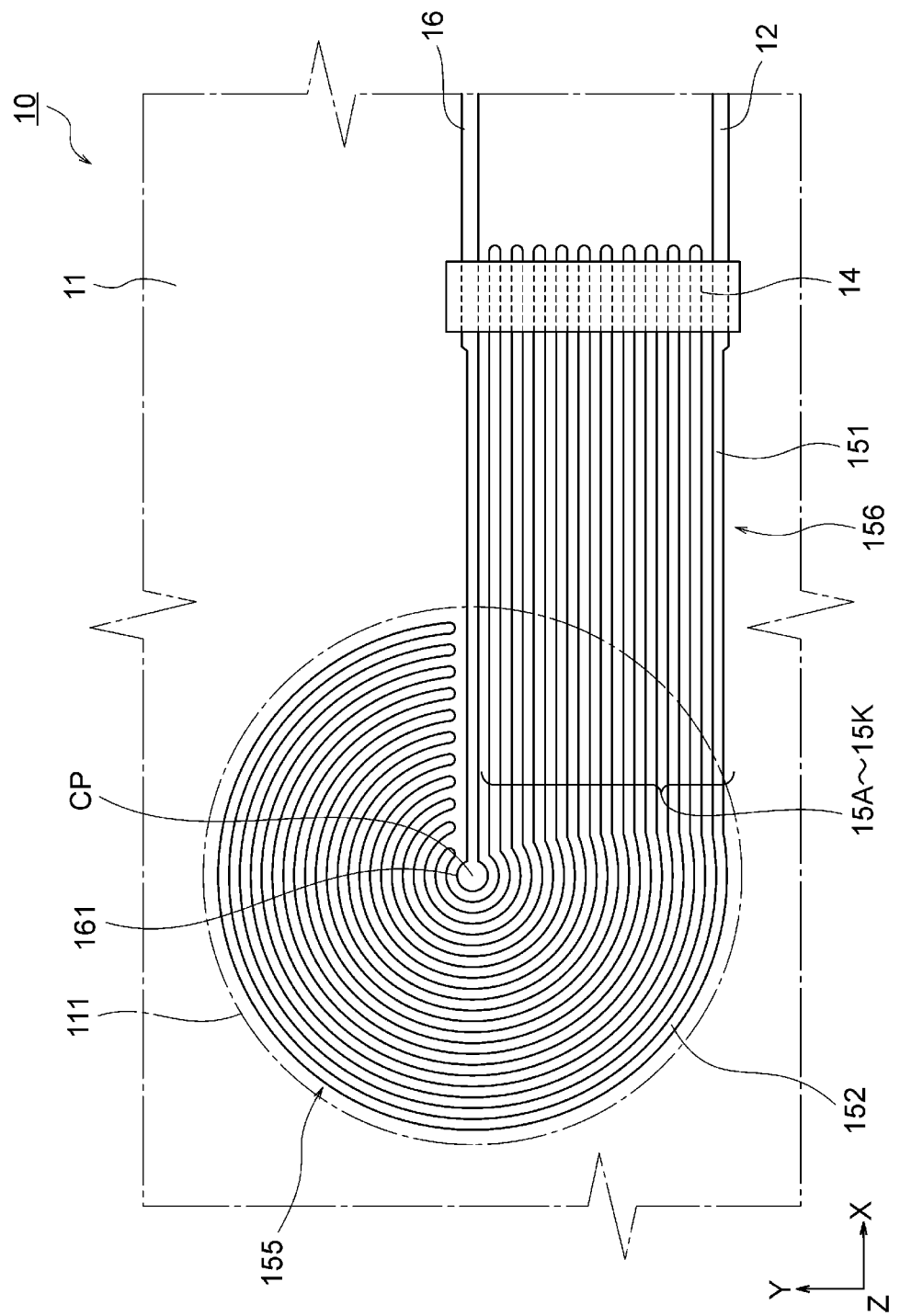
FIG. 13 is a cross-sectional view showing a lower membrane board of a pressure sensitive sensor in one or more embodiments.

For example, although not particularly shown, the power supply may be connected to the wiring patterns 12 and 16 without providing the wiring pattern 13. Alternatively, as shown in FIG. 13, instead of the wiring pattern 13, the wiring pattern 16 may be covered with the other end 142 of the resistor 14. Also in these cases, the resistance between the wiring patterns 12 and 16 changes according to the pushing force of the pushing element. FIG. 13 is a cross-sectional view showing a lower membrane board of a pressure sensitive sensor in a fourth example.

A seating sensor may be configured by using the pressure sensitive sensor 1A described above. This seating sensor is a sensor that detects the seating condition of an occupant on a seat mounted in a vehicle such as an automobile. Instead of the pressure sensitive sensor 1A, the pressure sensitive sensors 1B to 1D described in the above-described second to fourth examples may be used to configure the seating sensor.

Specifically, this seating sensor is configured by embedding a pressure sensitive sensor 1A in a seating portion of the seat of the vehicle. The number of pressure sensitive sensors 1A embedded in the seating portion of the seat is not particularly limited and may be one or multiple. The pressure sensitive sensor 1A is connected to, for example, an ECU (Electronic Control Unit) of the vehicle and outputs a voltage value to the ECU, and the voltage value corresponds to the resistance length (resistance value) of the resistor 14 according to the weight of the occupant.

When the occupant is seated on this seat, at least the tip portion 161 of the wiring pattern 16 and the innermost comb tooth pattern 15K are connected via the connecting body 22. Therefore, the ECU determines whether or not the occupant is seated on the seat by comparing the output value of the pressure sensitive sensor A1 with a predetermined threshold value.

Since the outermost comb tooth pattern among the comb tooth patterns 15A to 15K contacting the connecting body 22 changes according to the weight of the occupant seating on the seat, the resistance length (resistance value) of the resistor 14 changes according to the weight of the occupant. Therefore, the ECU classifies the weight of the occupant into weight ranges associated with the predetermined ranges by comparing the output value of the pressure sensitive sensor 1A with a plurality of predetermined ranges.

Although not particularly limited, these determination results by the ECU are used in, for example, an SBR (Seat Belt Reminder) system or the like.

The applications of the pressure sensitive sensors 1A to 1D described above are not limited to the seating sensor. For example, for an SRS system (Supplemental Restraint System) or the like, the pressure sensitive sensor 1A to 1D may be embedded in a seat back of the seat of the vehicle to detect the posture and physique of an occupant. Alternatively, the pressure sensitive sensors 1A to 1D described above may be used for applications other than automobiles.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1A to 1D . . . Pressure-sensitive sensor
10 . . . Lower membrane board
11 . . . Substrate
111 . . . Facing region
12 . . . Wiring pattern
121 . . . End portion 13 . . . Wiring pattern
131 . . . End portion
14 . . . Resistor
141 and 142 . . . End portion
15A to 15K . . . Comb tooth pattern
151 . . . Straight portion
152 . . . Arc portion
153 . . . Bent portion
155 . . . Detecting part
156 . . . Lead-out part
16 . . . Wiring pattern
161 . . . Tip portion (Enlarged portion)
163 . . . Bent portion
20 . . . Upper membrane board
21 . . . Substrate
22 . . . Connecting body
30 . . . Spacer
31 . . . Opening
40 . . . Pushing member
41 . . . Taperer portion
50 . . . Supporting member
51 . . . Leg portion

The invention claimed is:

1. A pressure sensitive sensor comprising:
a first substrate;
a resistor disposed on the first substrate;
a first wiring pattern disposed on the first substrate and connected to the resistor;
first comb tooth patterns disposed on the first substrate and individually connected to the resistor;
a pusher comprising:
a pushing part that faces the first comb tooth patterns and moves to the first substrate; and
a connecting body held by the pushing part and electrically connected to the first comb tooth patterns by pushing of the pushing part; and
a second wiring pattern that is either (i) disposed on the first substrate and electrically connected to the connecting body by pushing of the pushing part or (ii) included in the pusher and connected to the connecting body, wherein
a material of the resistor has an electrical resistivity higher than an electrical resistivity of a material of the first wiring pattern, an electrical resistivity of a material of the first comb tooth patterns, an electrical resistivity of a material of the connecting body, and an electrical resistivity of a material of the second wiring pattern,
the resistor does not overlap the connecting body in a plan view, and
a resistance value between the first wiring pattern and the second wiring pattern changes according to a load applied to the pushing part.

2. The pressure sensitive sensor according to claim 1, wherein
the first wiring pattern is connected to one end of the resistor,
the first comb tooth patterns are connected between the one end of the resistor and the other end of the resistor, and
the first comb tooth patterns are apart from each other along a longitudinal direction of the resistor.

3. The pressure sensitive sensor according to claim 1, wherein the first comb tooth patterns are apart from each other and substantially parallel to each other in a facing region where the first substrate faces the connecting body.

4. The pressure sensitive sensor according to claim 3, wherein the first comb tooth patterns are apart from each other from an inner side to an outer side of the pressure sensitive sensor in the facing region.

5. The pressure sensitive sensor according to claim 1, wherein the first comb tooth patterns are disposed concentrically around a specific point in a facing region where the first substrate faces the connecting body.

6. The pressure sensitive sensor according to claim 1,
the resistor has one end and the other end opposite to the one end in a longitudinal direction of the resistor,
the one end is closer to an outside of the pressure sensitive sensor than the other end in the longitudinal direction,
the first comb tooth patters include a first pattern and a second pattern that is closer to the other end than the first pattern,
the first substrate has a facing region where the first substrate faces the connecting body,
a distance between the second pattern and a pushing start position is smaller than a distance between the first pattern and the pushing start position in the facing region, and
the connecting body first contacts the first substrate at the pushing start position.

7. The pressure sensitive sensor according to claim 1, further comprising:
a third wiring pattern disposed on the first substrate and connected to the resistor;
a second comb tooth pattern disposed on the first substrate, facing the connecting body, and connected to the first wiring pattern; and
a third comb tooth pattern disposed on the first substrate, facing the connecting body, and connected to the third wiring pattern, wherein
the electrical resistivity of the material of the resistor is higher than an electrical resistivity of a material of the third wiring pattern, an electrical resistivity of a material of the second comb tooth pattern, and an electrical resistivity of a material of the third comb tooth pattern, and
the first comb tooth patterns, the second comb tooth pattern, and the third comb tooth pattern are apart from each other and substantially parallel to each other in a facing region where the first substrate faces the connecting body.

8. The pressure sensitive sensor according to claim 1, wherein
the pusher further comprises:
a second substrate having the connecting body; and
a spacer disposed between the first substrate and the second substrate and having an opening through which the connecting body faces the first comb tooth patterns.

9. The pressure sensitive sensor according to claim 1, wherein the second wiring pattern faces the connecting body.

10. The pressure sensitive sensor according to claim 1, wherein the second wiring pattern is connected to the resistor.

* * * * *